(12) United States Patent
Alam et al.

(10) Patent No.: US 11,362,539 B1
(45) Date of Patent: Jun. 14, 2022

(54) ARTIFICIAL INTELLIGENCE-BASED POWER CONTROLLER FOR LOW VOLTAGE RIDE-THROUGH CONTROL OF GRID CONNECTED DISTRIBUTED GENERATION NETWORKS

(71) Applicant: King Abdulaziz University, Jeddah (SA)

(72) Inventors: Md Mottahir Alam, Jeddah (SA); Ibrahim M. Mehedi, Jeddah (SA); Nebras Sobahi, Jeddah (SA); Asif Irshad Khan, Jeddah (SA); Md. Moddassir Alam, Hafr Al-Batin (SA); Ahteshamul Haque, New Delhi (IN); Samir Kasim, Jeddah (SA); Varaha Satya Bharath Kurukuru, Andhra Pradesh (IN)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/536,796

(22) Filed: Nov. 29, 2021

(51) Int. Cl.
*H02J 3/16* (2006.01)
*H02J 3/06* (2006.01)
(Continued)

(52) U.S. Cl.
CPC .... *H02J 13/00002* (2020.01); *G05B 13/0265* (2013.01); *H02J 3/381* (2013.01); *H02J 13/00036* (2020.01); *H02J 2300/26* (2020.01)

(58) Field of Classification Search
CPC ............... H02J 13/00002; H02J 3/381; H02J 13/00036; H02J 2300/26; G05B 13/0265
See application file for complete search history.

(56) References Cited

U.S. PATENT DOCUMENTS

| 10,250,160 B2* | 4/2019 | Jalili ............... H02M 7/537 |
| 2014/0210282 A1* | 7/2014 | Dong ................ H03L 7/08 |
| | | 307/151 |

(Continued)

FOREIGN PATENT DOCUMENTS

CN        106712094 A        5/2017

OTHER PUBLICATIONS

Muthusamy, et al. ; Artificial Intelligence Techniques-Based Low Voltage Ride Through Enhancement of Doubly Fed Induction Wind Generator ; Journal of Mechanics of Continua and Mathematical Sciences vol. 15, No. 3, Mar. 2020 pp. 125-139.

*Primary Examiner* — Rexford N Barnie
*Assistant Examiner* — Thai H Tran
(74) *Attorney, Agent, or Firm* — Oblon, McClelland, Maier & Neustadt, L.L.P.

(57) ABSTRACT

An artificial intelligence reactive power control system for low voltage ride-through in a grid connected distributed generation network includes a grid, a circuit breaker, a distributed generation circuit including 3-phase terminals, and a voltage and current measurement unit connected to the 3-phase terminals and configured to generate a set of measured variables. An intelligent low voltage ride-through detector receives the set of measured variables and identifies a low voltage ride-through status of the utility grid. An intelligent reactive power controller receives a low voltage ride-through status signal from the intelligent low voltage ride-through detector and controls a low voltage ride-through during a grid voltage sag and a voltage reduction by transmitting one or more of an active power reference and a reactive power reference value to the distributed generation circuit based on the low voltage ride-through status signal.

14 Claims, 12 Drawing Sheets

(51) Int. Cl.
*H02J 13/00* (2006.01)
*G05B 13/02* (2006.01)
*H02J 3/38* (2006.01)

(56) References Cited

U.S. PATENT DOCUMENTS

| | | | |
|---|---|---|---|
| 2015/0280546 A1* | 10/2015 | Kouno | H02M 1/32 363/132 |
| 2015/0365014 A1* | 12/2015 | Lin | H02M 1/44 363/40 |
| 2021/0055334 A1 | 2/2021 | Min et al. | |

* cited by examiner

ARTIFICIAL INTELLIGENCE-BASED POWER CONTROLLER FOR LOW VOLTAGE RIDE-THROUGH CONTROL OF GRID CONNECTED DISTRIBUTED GENERATION NETWORKS

STATEMENT OF ACKNOWLEDGEMENT

The inventors acknowledge the financial support provided by the Deputyship for Research & Innovation, Ministry of Education in Saudi Arabia through project number 2021-023 and by King Abdulaziz University, DSR, Jeddah, Saudi Arabia.

BACKGROUND

Technical Field

The present disclosure relates to an artificial intelligence-based power control unit for low voltage ride-through control in a grid connected distributed generation network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A utility grid is an interconnected network that delivers electricity from power-producing firms to consumers. The utility grid system includes various units such as a power generation unit, a power transportation unit for carrying the generated power from the power generation unit to the consumer side, and a substation unit connected to the power transportation unit for receiving the generated power as well as converting into a required power suitable for household or industries loads.

In order to reduce the load on the utility grid system, a grid connected distributed generation system is used. The grid connected distributed generation system supports the utility grid system by providing excess power generated by renewable energy generation units such as consumer solar based devices. The grid connected distributed generation system includes a grid system and a renewable energy power generation unit such as solar or wind power. In some instances such as on a sunny day, the grid connected distributed generation system may not only fulfill the load requirement of a household but may also feed excess power to the utility grid. The integration of the distributed generation system, possibly including an energy storage system, may support the utility grid during load variation and voltage sag situations. However, this integration has caused some problems with both the utilities and the integrating distributed generation units. The transient variation in the loading levels, malfunctions with the loading process, and minor voltage dips close to industrial operations may have a severe impact on the transmission level, which results in large voltage dips in the system. These large voltage dips impact the grid synchronization process of the distributed generation systems, which leads to unwanted disconnection of individual systems and abnormal operations in the grid. This affects both stability and reliability of the utility, the power transmission network, and the distributed generation system. These aspects have led to the development and use of a fault ride-through mechanism for grid connected distributed generation systems. Conventional fault ride-through mechanisms do not sufficiently ensure the operation of sensitive devices in the network during the voltage disturbances. Hence, there is a need for control solutions which can handle grid operations during voltage disturbances and provide a low voltage fault ride-through.

SUMMARY

In an exemplary embodiment, a reliable artificial intelligence reactive power control system for low voltage ride-through in a grid connected distributed generation network is disclosed which is connected at the terminals of a grid connected photovoltaic inverter system to monitor and control its operation. The artificial intelligence reactive power control system includes a utility grid, a 3-phase grid circuit breaker connected to the utility grid, a distributed generation circuit including 3-phase terminals connected to the 3-phase grid circuit breaker, a voltage and current measurement unit connected to the 3-phase terminals and configured to generate a set of measured variables, ($i_g$, $v_g$), an intelligent low voltage ride-through detector is configured to receive the set of measured variables and to identify a low voltage ride-through status of the utility grid, and an intelligent reactive power controller connected between the intelligent low voltage ride-through detector and the distributed generation circuit. The intelligent reactive power controller is configured to receive a low voltage ride-through status signal from the intelligent low voltage ride-through detector, and control a low voltage ride-through during one or more of a grid voltage sag and a voltage reduction by transmitting one or more of an active power reference value and a reactive power reference value to the distributed generation circuit based on the low voltage ride-through status signal.

In another exemplary embodiment, a method for reactive power control of a low voltage ride-through in a grid connected distributed generation network is disclosed. The method includes receiving a set of grid codes specifying rules for connecting a distributed generation circuit to a set of 3-phase connectors of a utility grid. The method further includes measuring a voltage and a current of each of the 3-phase connectors and generating a set of measured variables. The method further includes identifying, by an intelligent low voltage ride-through detector, a low voltage ride-through status of the utility grid. The method further includes receiving, by an intelligent reactive power controller, a low voltage ride-through status signal from the intelligent low voltage ride-through detector. The method further includes controlling a low voltage ride-through during at least one time period including one or more of a grid voltage sag and a voltage reduction by transmitting one or more of an active power reference value and a reactive power reference value to the distributed generation circuit based on the low voltage ride-through status signal. The method further includes sending a trip signal to a 3-phase grid circuit breaker connected to the set of 3-phase connectors of the utility grid to turn off the 3-phase grid circuit breaker when a low voltage ride-through status is detected in which the low voltage persists for a duration greater than a preset time limit.

In another exemplary embodiment, a non-transitory computer readable medium having instructions stored therein that, when executed by one or more processors, cause the one or more processors to perform a method for reactive power control of a low voltage ride-through in a grid connected distributed generation network. The method includes receiving a set of grid codes specifying rules for connecting a distributed generation circuit to a set of 3-phase connectors of a utility grid. The method further includes measuring a voltage and a current of each of the 3-phase connectors and generating a set of measured variables. The method further includes identifying, by an intelligent low voltage ride-through detector, a low voltage ride-through status of the utility grid. The method further includes receiving, by an intelligent reactive power controller, a low voltage ride-through status signal from the intelligent low voltage ride-through detector. The method further includes controlling a low voltage ride-through during at least one time period including one or more of a grid voltage sag and a voltage reduction by transmitting one or more of an active power reference value and a reactive power reference value to the distributed generation circuit based on the low voltage ride-through status signal. The method further includes sending a trip signal to a 3-phase grid circuit breaker connected to the set of 3-phase connectors of the utility grid to turn off the 3-phase grid circuit breaker when a low voltage ride-through status is detected in which the low voltage persists for a duration greater than a preset time limit.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
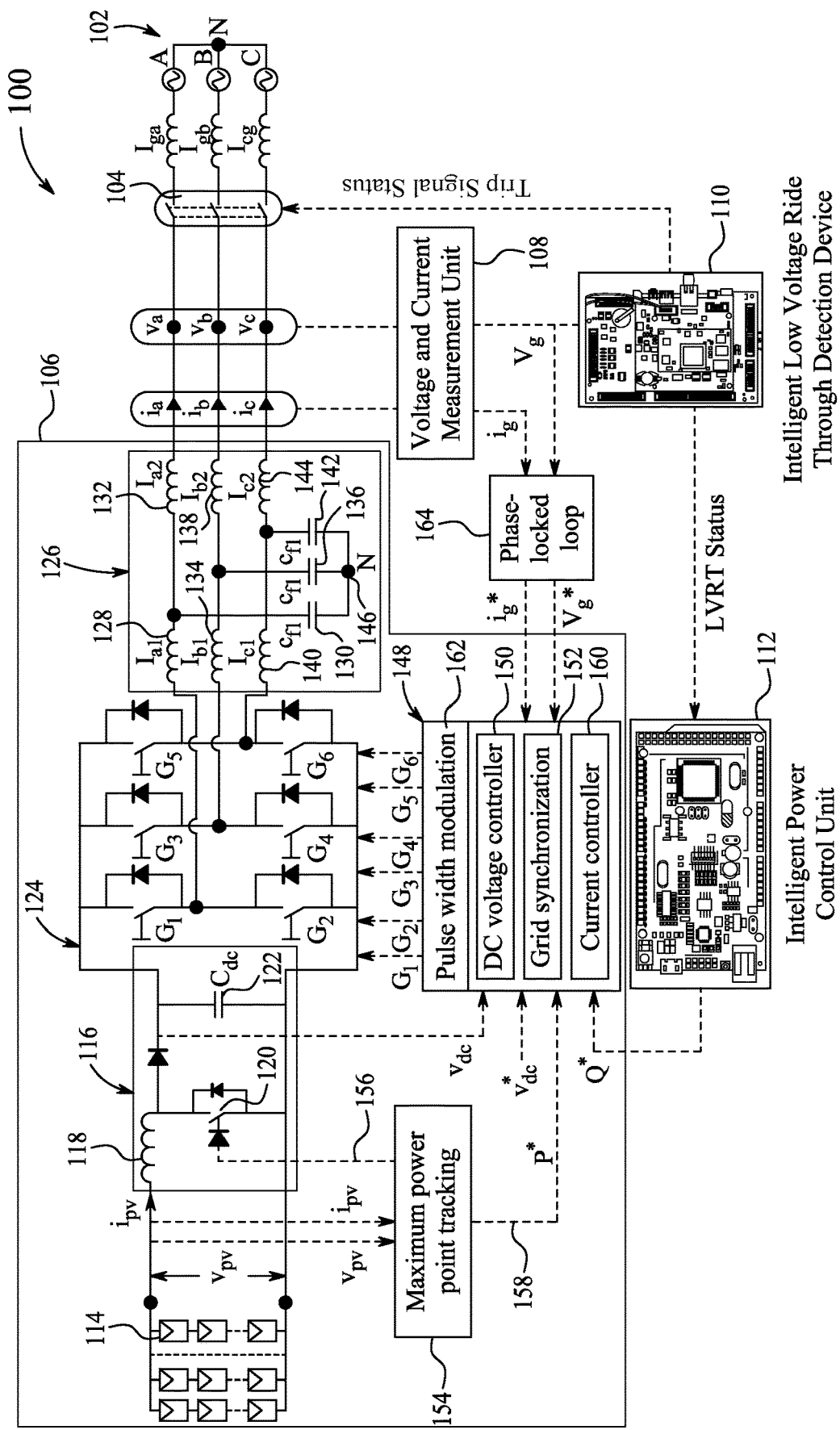
FIG. 1 is an exemplary schematic diagram of an artificial intelligent reactive power control system for low voltage ride-through at a utility grid, according to certain embodiments.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In the present disclosure, the terms "grid", "power grid" and "utility grid" refer to an interconnected power distribution network for electricity delivery from utility providers to consumers. It consists of: power stations: often located near energy and away from heavily populated areas, electrical substations to step voltage up or down, electric power transmission to carry power long distances, and electric power distribution to individual customers, where voltage is stepped down again to the required service voltages. Grids are nearly always synchronous, meaning all distribution areas operate with three phase alternating current (AC) frequencies synchronized (so that voltage swings occur at almost the same time). This allows transmission of AC power throughout the area, connecting a large number of electricity generators and consumers and potentially enabling more efficient electricity markets and redundant generation. The electricity is distributed to consumers by a substation connected to the power distribution network. The substation includes a set of three conductors, one for each phase of current. This connection to the three phase conductors at the substation is referred to as a utility grid connection.

Aspects of the present disclosure are directed to a system, device, and method for low voltage ride-through in a grid-connected distributed generation network using an artificial intelligence reactive power control system. The present disclosure describes an artificial intelligence reactive power control system that achieves a low voltage ride-through by simulating working conditions in an electrical utility grid. The simulation provides the ability to monitor the effects of potential grid abnormalities on the per unit voltage magnitude, rate of change of voltage, frequency, and rate of change of frequency. A time/frequency-domain analysis of the network variables is carried out and informative signatures are generated for training with an intelligent learning algorithm. Based on the training, an intelligent fault ride-through detection approach is generated. Further the present disclosure provides an intelligent reactive power controller supported by a fault detection mechanism. The intelligent reactive power controller estimates the power references for the utility grid based on identified system conditions and injects the active and reactive power as per the utility grid requirement. The intelligent reactive power controller regulates overcurrent during transient voltage sag conditions, with the goal of avoiding any momentary disconnection of the distributed generation units when the voltage sag condition is under grid standard specification limits.

FIG. 1 is an exemplary schematic diagram of the artificial intelligence reactive power control system 100 for low voltage ride-through in a grid connected distributed generation network. The artificial intelligence reactive power control system 100 (hereinafter referred to as system 100) includes various components such as a utility grid 102, a 3-phase grid circuit breaker 104, a distributed generation circuit 106, a voltage and current measurement unit 108 connected to 3-phase terminals, an intelligent low voltage ride-through (LVRT) detector 110, and an intelligent reactive power controller 112.

The intelligent LVRT detector 110 is configured to provide the voltage ride-through status of the utility grid 102. The intelligent reactive power controller 112 is configured to receive a LVRT status signal from the intelligent LVRT detector 110. Using the LVRT status signal, the intelligent reactive power controller 112 controls the LVRT during one or more of a grid voltage sag and a voltage reduction by transmitting one or more of an active power reference value and a reactive power reference value to the distributed generation circuit 106 based on the LVRT status signal. The intelligent reactive power controller 112 may also be a special-purpose processor or general-purpose processor. In some examples, the intelligent reactive power controller 112 may also include circuitry along with program instructions stored therein to control the active power and the reactive power during the voltage sag and voltage dip.

Each component of the system 100 is now described in detail with reference to the FIG. 1. The utility grid 102 may be configured to supply the electric power or energy from a large distance or a short distance. The utility grid 102 is configured to provide an AC supply to a distribution system.

The 3-phase grid circuit breaker 104 of the system 100 is electrically connected to the utility grid 102. The 3-phase grid circuit breaker 104 may refer to a standard circuit breaker that may include single-pole and double-pole circuit breakers, ground fault circuit interrupter circuit breakers, arc fault circuit interrupter circuit breakers or any other 3-phase grid circuit breaker 104. In some examples, the 3-phase grid circuit breaker 104 may be a proprietary or custom made circuit breaker. In an aspect, the 3-phase grid circuit breaker 104 is configured to interrupt the electrical contacts between the distributed generation circuit 106 and the utility grid 102 based on a trip signal generated by the intelligent LVRT detector 110 during the unwanted fluctuation of the utility grid 102 such as a voltage sag or a voltage dip or an overvoltage.

The distributed generation circuit 106 of the system 100 comprises plurality of electrical components including 3-phase terminals, a distributed energy generator 114, a boost converter 116, an inverter 124, a 3-phase low pass filter 126, an inverter controller 148, and a maximum power point tracking circuit 154. The 3-phase terminals are electrically coupled to the 3-phase grid circuit breaker 104. The distributed energy generator 114 may refer to a power source such as renewable power sources, which may be electrically coupled in at least one of series and parallel. The renewable power sources include, but are not limited to, a plurality of photovoltaic panel arrays, a plurality of wind power turbines, a plurality of wave generators, and such like naturally available resources.

Further, the distributed generation circuit 106 includes a boost converter 116 electrically coupled to the distributed energy generator 114. The boost converter 116 is a DC-to-DC power converter that steps up the voltage from the distributed energy generator 114 in instances such as a case of low solar irradiance in a photovoltaic energy generator. An example circuit of the boost converter 116 may include a first inductor 118, a first switch 120, and a first capacitor 122 in parallel with the first switch 120. In an example, the boost converter 116 may be selected from the group containing a linear boost converter, a switched boost converter or any boost converter. Further, the distributed generation circuit 106 includes the inverter 124 electrically connected to the boost converter 116 for receiving and converting the DC power from the distributed energy generator 114 into an equivalent AC power. In an example, the inverter 124 may be a photovoltaic inverter. The inverter 124 includes a plurality of second switches. For example, the inverter 124 may comprise of three pairs of series-connected second switches, that is, G1-G2, G3-G4 and G5-G6 as referred in FIG. 1.

Further, the distributed generation circuit 106 of the system 100 includes a 3-phase low pass filter 126 having 3-phase input connectors connected to the inverter 124 and the 3-phase output terminals of the utility grid 102 connected to the 3-phase grid circuit breaker 104. For example, the 3-phase low pass filter 126 has an input terminal and an output terminal. The input terminal is electrically connected to the three pairs of series-connected second switches (that is, G1-G2, G3-G4 and G5-G6), while the output terminal is electrically coupled to the 3-phase grid circuit breaker 104. As illustrated, the 3-phase low pass filter 126 comprises a first phase inductor 128 electrically connected to a first phase capacitor 130 and a first switching inductor 132, and the first phase capacitor 130 is coupled to a neutral connection N (also referred to as a ground connection point 146). Similarly, a second phase inductor 134 is electrically connected to a second phase capacitor 136 and a second switching inductor 138, and the second phase capacitor 136 is connected to the ground connection point 146. Similarly, a third phase inductor 140 is electrically connected to a third phase capacitor 142 and a third switching inductor 144, and the third phase capacitor 142 is electrically connected to the ground connection point 146. Also, the outputs of the first switching inductor 132, the second switching inductor 138, and the third switching inductor 144 are each electrically connected to a respective phase of the 3-phase grid circuit breaker 104. A first pair of switches among the second switches, G1-G2 of the inverter 124 has a first common output connected to the first phase input of the 3-phase low pass filter 126, that is, with the first phase inductor 128. Similarly, the second pair of switches of the second switches, that is, G3-G4 of the inverter 124 has a second common output electrically connected to the second phase input of the 3-phase low pass filter 126, that is, with the second phase inductor 134. Similarly, the third pair of switches of the second switches, that is, G5-G6 of the inverter 124 has a third common output electrically connected to the third phase input of the 3-phase low pass filter 126, that is, with the third phase inductor 140.

The distributed generation circuit 106 includes a maximum power point tracking circuit 154, hereinafter referred to as the MPPT circuit 154. The MPPT circuit 154 utilizes the distributed energy generator 114 at its maximum power generation. The input terminals of the MPPT circuit 154 are electrically connected to the output terminals of the distributed energy generator 114 to receive a voltage ($v_{pv}$) and a current ($i_{pv}$) from the distributed energy generator 114. An MPPT control output line 156 of the MPPT circuit 154 is electrically connected to the first switch 120 of the boost converter 116. An MPPT power setpoint output line 158 (P*) is electrically connected to the inverter controller 148.

The inverter controller 148 is configured to control the series connected switches of the inverter 124. The inverter controller 148 includes a DC voltage controller 150 electrically connected to the boost converter 116 in order to receive a boost converter DC voltage input, $V_{dc}$. The DC voltage controller 150 stabilizes the generation of the AC signal from the inverter 124 from the DC signal provided by the distributed energy generator 114. The inverter controller 148 also includes a grid synchronization circuit 152. The grid synchronization circuit 152 is configured to receive a DC voltage setpoint value, $V_{dc}$* and the MPPT power setpoint output, P*. The DC voltage setpoint value, $V_{dc}$* is generated by electrically connecting a convertor circuit (not shown) at the output line of the boost converter 116. For example, $V_{dc}$ signal may be passed through a convertor circuit (not shown) in order to generate $V_{dc}$* signal, which acts as an input signal to the grid synchronization circuit 152. In an example implementation, a circuit for generating $V_{dc}$* signal may be an integral part of the boost converter 116 for simultaneously generating $V_{dc}$ and $V_{dc}$* signal. The inverter controller 148 further includes a current controller 160. An input of the current controller 160 is connected to the output of intelligent reactive power controller 112. Based on the LVRT status signal from the intelligent LVRT detector 110, the intelligent reactive power controller 112 generates one or more of the active power reference value and the reactive power reference value and provides these active and reactive power reference values to the input of the current controller 160. The inverter controller 148 also includes a pulse width modulator 162. The pulse width modulator 162 is electrically connected to the inverter 124. The pulse width modulator 162 is configured to generate drive signals for the series connected switches of the inverter 124. The drive signal are based on the one or more of the active power reference value and the reactive power reference value generated by the intelligent reactive power controller 112. Based on the one or more of the active power reference value and the reactive power reference value, the drive signals actuate the plurality of the series connected switches of the inverter 124.

The voltage and current measurement unit 108 is electrically connected to the 3-phase terminals. The voltage and current measurement unit 108 is electrically connected with output of the 3-phase low pass filter 126 for measuring the voltage and current values at each phase. The voltage and current measurement unit 108 is configured to generate a set of measured variables, ($i_g$, $v_g$) for a sampling time period. For example, each phase at the output of the 3-phase low pass filter 126 may generate a current and voltage signal. Since there are 3 phases of the low pass filter 126, the voltage and current measurement unit 108 generates six measurements of $i_g$, and $v_g$, that is, 2 measurements for each phase at each instance within the sampling time. The collected current and voltage measurements for each phase may be averaged over the sampling time. The voltage and current measurement unit 108 further includes a terminal voltage monitor and a current monitor (not shown). The terminal voltage monitor is configured to identify one or more of a grid voltage sag and a voltage reduction in the distributed generation circuit. The current monitor is configured to measure a load variation during at least one time period including the one or more of the grid voltage sag and the voltage reduction. For example, if the utility grid 102 detects one or more of a grid voltage sag, overvoltage, and a voltage reduction, the terminal voltage monitor of the voltage and current measurement unit 108 detects the one or more of the grid voltage sag, the overvoltage, and the voltage reduction. At the same time, the current monitor simultaneously measures the load variation due to the one or more of the grid voltage sag, overvoltage, and the voltage reduction. The voltage and current measurement unit 108 further includes a voltage dip detection unit (not shown). The voltage dip detection unit can identify the range of the voltage during any persistence of the voltage sag, the overvoltage, or the voltage reduction. For example, a set voltage limit above or below a nominal operating voltage of the utility grid 102 may be defined by an operator of the system 100 or it may be defined by a grid code. Any voltage above or below the set voltage limit is considered as the overvoltage or the voltage sag or a voltage reduction, respectively, is confirmed by the voltage dip detection unit. The voltage dip detection unit is simultaneously configured to identify the duration of the one or more of the grid voltage sag and the voltage reduction. For example, if a voltage sag, overvoltage or a voltage reduction is detected, the voltage dip detection unit not only identifies the voltage range but also monitors for how long this unexpected situation is persisting. The terminal voltage monitor and the current monitor of the voltage and current measurement unit 108 may be configured to identify one or more of the voltage reduction and the voltage sag at selected time intervals or sampling intervals. The time interval may be 2-second interval, 4-second interval, a 1 millisecond interval or the like. The terminal voltage monitor and the current monitor may be configured to identify one or more of the voltage reduction and the voltage sag as on a continuous basis, such as at a nano or a pico second interval. In an example, the voltage and current measurement unit 108 may comprise an ampere meter and a voltmeter.

The intelligent LVRT detector 110 may include circuitry having program instructions stored therein configured to monitor the utility grid 102, identify an LVRT and generate an LVRT status. In one example implementation, the intelligent LVRT detector 110 may be implemented as a processor or a controller configured to provide the LVRT status of the utility grid 102. In another example implementation, the intelligent LVRT detector 110 may be a special-purpose processor or general-purpose processor. The intelligent LVRT detector 110 also includes a database (not shown). The database includes a set of LVRT condition data of the distributed generation circuit 106. The set of LVRT condition data may include information including conditions based on the various grid voltage $v_g$, situations that lead to a generation of the LVRT condition of the utility grid 102. For example, if $v_g$ is too low for a specific duration such as a 0.2 us, it indicates a presence of a voltage sag in the utility grid 102. Similarly, if $v_g$ is too high for a specific duration such as a 0.1 ms, it indicates a presence of an overvoltage or a voltage transient in the utility grid 102. Accordingly, these unexpected voltage levels of the utility grid 102 represent the possible set in the database for identifying the LVRT conditions that the utility grid 102 connected distributed energy generator 114 may encounter during a regular operation. The database may be any database configured to store the set of LVRT condition data. The database may be operated using, for example, structured query language (SQL) or VH SICHD languages. In an example implementation, the database may be implemented outside the intelligent LVRT detector 110 such as at a remote computing device or a cloud computing device, such that, using either wired or wireless communication facilities, the intelligent LVRT detector 110 may communicate with the remote computing device and accesses the database. The intelligent LVRT detector 110 further includes a set of low pass filters and a set of high pass filters for processing the utility grid voltage $v_g$. The low pass filters and high pass filters may be implemented as a digital filters or as an analog filters using the combination of resistor, capacitor or inductors over the intelligent LVRT detector 110.

The intelligent LVRT detector 110 further includes a trip signal generator (not shown). The trip signal generator is electrically connected to the 3-phase grid circuit breaker 104. The trip signal generator is configured to turn off the 3-phase grid circuit breaker 104 when the LVRT status is detected in which the low voltage persists for a duration greater than a preset time limit. For example, if the intelligent LVRT detector 110 detects the requirement to inject only the active power to the system 100, the intelligent LVRT detector 110 does not generate any trip signal, as the voltage sag or an overvoltage is already within the defined permissible voltage range, that is, $\pm u_1$. If the intelligent LVRT detector 110 detects a requirement to inject both, the active power as well as the reactive power as the detected grid voltage $v_g$ at the point of common coupling is above $\pm u_1$ but below $\pm u_2$, the trip signal generator of the intelligent LVRT detector 110 generates the trip signal and forwards the trip signal to the 3-phase grid circuit breaker 104 to disconnect the utility grid 102 from the system 100 if the voltage stabilization does not happen even after injecting the active power and the reactive power to the inverter controller 148 when the system 100 does not recover within the permissible defined voltage range within $T_1$ seconds. Here $T_1$ may be defined as 0.1 seconds or 0.5 seconds as defined by the grid code. Similarly, if the intelligent LVRT detector 110 detects a requirement to inject only reactive power when the detected grid voltage $v_g$ at the point of common coupling is above $\pm u_2$ voltage range, an indication of a presence of high voltage transients in the utility grid 102 is identified. In this situation, the trip signal generator of the intelligent LVRT detector 110 generates the trip signal and forwards the trip signal to the 3-phase grid circuit breaker 104 in order to disconnect the utility grid 102 from the system 100 when the voltage does not stabilize after injecting the reactive power to the inverter controller 148 and the system 100 does not recover within the permissible defined voltage range within $T_2$ seconds. In a non-limiting example, $T_2$ may be defined as 1 second or 3 seconds as defined by the grid code.

The system 100 further includes the intelligent reactive power controller 112. Based on the LVRT condition and the requirements to balance the active power and the reactive power, the intelligent reactive power controller 112 calculates an optimum active power and the reactive power and controls the inverter controller 148 accordingly, to prevent the utility grid 102 from being disconnected as per the grid code requirement.

The system 100 further includes a phase locked loop 164. The phase lock loop 164 is electrically connected between the voltage and current measurement unit 108 and the inverter controller 148. The phase locked loop includes a voltage-controlled oscillator, a charge pump and a loop filter. The phase locked loop is configured to match a phase of each measured variable of the set of measured variables to a phase of a square wave generated by the voltage-controlled oscillator. For example, the three-phase voltage and current generated by the 3-phase low pass filter 126 includes a voltage and current variable, which includes a total 6 outputs in 3 phase lines. The phase lock loop 164 is configured to continuously match the phase of voltage and current in each line 3 phase line with the phase of a square wave generated by the voltage-controlled oscillator of the phase lock loop 164. The phase lock loop 164 generates a phase modified grid current, $i_g^*$ and a phase modified grid voltage, $v_g^*$, at the output of the phase lock loop 164 and transmits these variables to the inverter controller 148, so that the phase current and phase voltage variable generated by the inverter 124 continues to remain with the same phase of the utility grid 102.

In operation, the intelligent LVRT detector 110 receives a set of grid codes specifying rules for connecting the distributed generation circuit 106 to a set of 3-phase connectors of the utility grid 102. The grid codes specify the minimum requirement of injection of additional active power or reactive power to the utility grid 102 such that the utility grid 102 remains connected to the distributed energy generator 114 and temporarily disconnection of the utility grid 102 is avoided whenever a voltage sag or voltage swell/overvoltage is detected in the utility grid 102. The 3-phase connectors are electrical lines connecting the distributed generation circuit 106 with the utility grid 102. In one or more examples, the set of grid codes are provided through an external computing device. The voltage and current measurement unit 108 measures the voltage and a current of each of the 3-phase connectors and generates a set of measured variables. The intelligent LVRT detector 110 may receive and process the set of measured variables. Based on the set of measured variables, the intelligent LVRT detector 110 generates the LVRT status of the utility grid 102. In order to generate the LVRT status, the intelligent LVRT detector 110 is configured to receive the set of measured variables and identify the LVRT status of the utility grid 102. The LVRT detector 110 is configured to accept a grid voltage $v_g$ from the voltage and current measurement unit 108 and simulate the identified conditions in the utility grid 102. The simulation identifies the effect of potential grid abnormalities on the per unit voltage magnitude, rate of change of voltage dv/dt, frequency (f), and rate of change of frequency df/dt. The LVRT detector 110 is further configured to train a classifier from various conditions of voltage sag and overvoltage and identify the persistence of the voltage sag and overvoltage in the utility grid 102 (for example, explained in FIG. 2A). Based on the conditions identified and the duration of the voltage sag and overvoltage, the LVRT detector 110 calculates an active power reference value and a reactive power reference value. The LVRT detector 110 outputs an LVRT status along with active power reference value and reactive power reference value to the intelligent power controller 112.

The intelligent reactive power controller 112 may receive the LVRT status signal. Based on the LVRT status signal, the intelligent reactive power controller 112 controls the LVRT during at least one time period, including one or more of a grid voltage sag and a voltage reduction by transmitting one or more of an active power reference value and a reactive power reference value to the distributed generation circuit 106 based on the LVRT status signal. The intelligent reactive power controller 112 may monitor the LVRT status signal over a period of time, which may be the preset time limit. In response to an unwanted LVRT status persisting for a duration greater than the preset time limit, the intelligent reactive power controller 112 communicates a trip signal to a 3-phase grid circuit breaker 104 that is connected to the set of 3-phase connectors of the utility grid 102 to break the circuit or to turn off the 3-phase grid circuit breaker 104.

As described earlier, the intelligent LVRT detector 110 is configured to train a classifier from various conditions of voltage sag and overvoltage and identify the persistence of the voltage sag and overvoltage in the utility grid 102. A process for training the intelligent LVRT detector 110 is described in FIG. 2A.

Figure 2A:
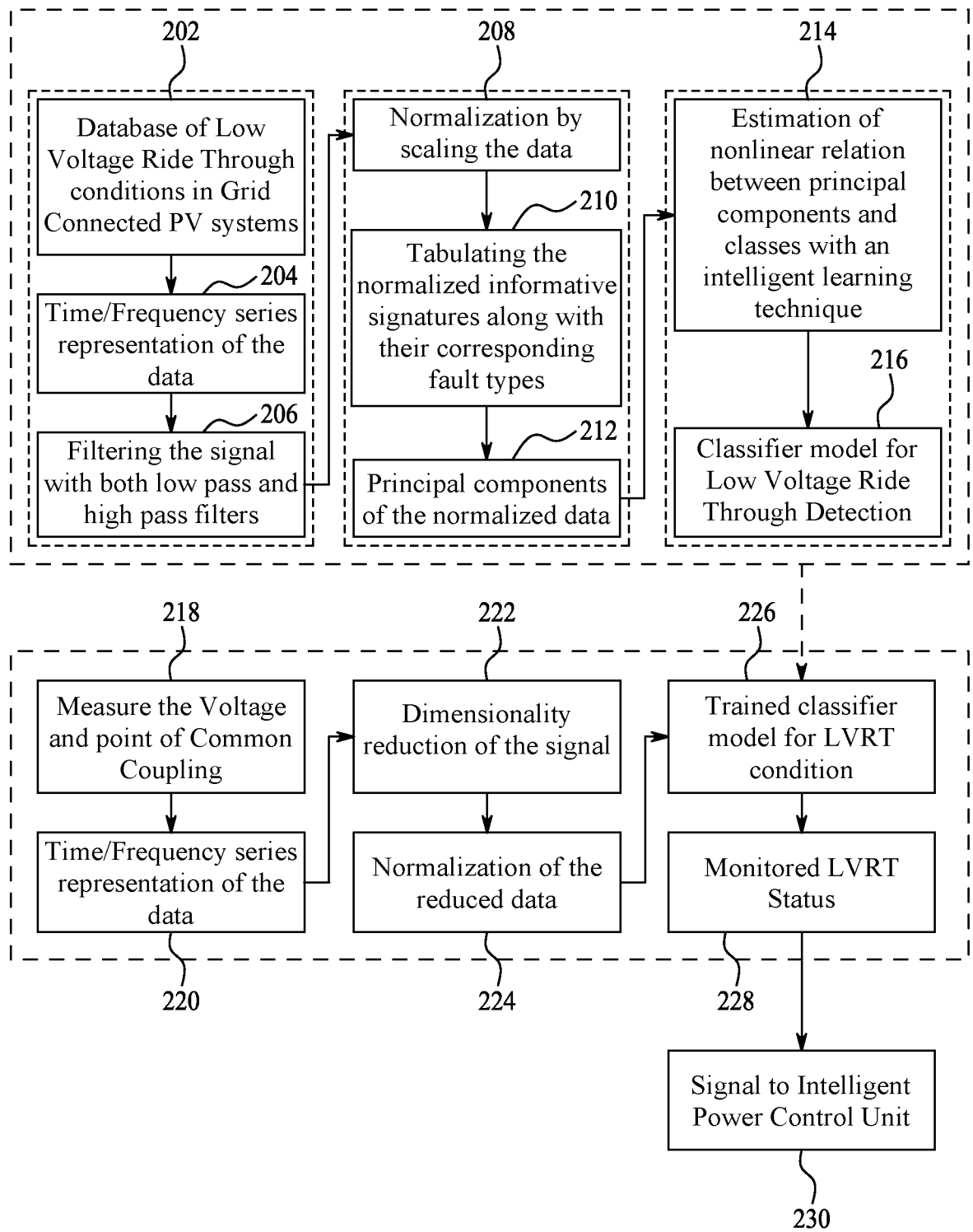
FIG. 2A is an exemplary flowchart for low voltage ride-through detection and reactive power control, according to certain embodiments.

FIG. 2A illustrates an exemplary process flow for LVRT detection and reactive power control, according to some embodiments. Steps 202 to steps 216 describe a process for training the intelligent LVRT detector 110. In step 202, the intelligent LVRT detector 110 obtains a set of LVRT conditions in grid connected systems. In one example, the LVRT conditions may be obtained from the set of grid codes. The grid codes may be stored in the database. In another example, the LVRT conditions may be obtained from external sources or from an internal database of LVRT conditions collected over previous sampling times. In step 204, the intelligent LVRT detector 110 generates a time/frequency series representation of the set of LVRT condition data. For example, the microprocessor may access the database for the stored set of LVRT condition data. In step 204, using the database, the microprocessor may generate a time/frequency series representation of the set of LVRT condition data. In an example, the time/frequency series representation may be a Fourier series representation of the LVRT condition data. Once the set of LVRT condition data is represented in the time/frequency series representation, in step 206, the intelligent LVRT detector 110 filters the time/frequency series representation using a set of low pass filters and a set of high pass filters within the LVRT detector 110, to generate informative signatures only. The set of low pass filters and the set of high pass filters filter the unwanted signals, in order to train an intelligent learning algorithm in the intelligent LVRT detector 110 using such informative data. One example circuit having the set of low pass filters and the set of high pass filters is illustrated in FIG. 2C. The example circuit is a multi-level circuit having 'n' levels for obtaining a detailed coefficient, and at least one level for obtaining an approximation coefficient. The circuit includes a set of low pass filters 262, 266, 268, 274, 278 and 282, and a set of high pass filters 264, 270, 272, 276, 280, and 284. Each level may have a low pass filter and/or a high pass filter as per design. For example, at a first level, the circuit includes the high pass filter 272 and the high pass filter 284. The circuit, at a second level includes the high pass filter 270, the high pass filter 280, the low pass filter 268 and the low pass filter 282.

The circuit uses a discrete wavelet transform approach for evaluating the time/frequency series representation. The time/frequency series representation is obtained as a measured signal 290 and provided as input to 'n' levels. In the discrete wavelet transform approach, the circuit may decompose (through a decomposition 298 portion of the circuit) the time/frequency series representation into approximation and detailed coefficients with different resolutions at different frequency bands. The decomposition 298 includes down sampling of signals. As illustrated in FIG. 2C, the low pass filter 282 performs an approximation to obtain approximation coefficients. The 'n' levels may obtain detailed coefficients. Obtaining detailed coefficients is achieved with successive low pass and high pass filtering of the time domain signal. The filtering of the time domain signal is executed with the wavelet and scaling functions associated with the low pass and high pass filters respectively. Initially, the time domain signal is passed through a half-band low pass filter (LPF) and high pass filter (HPF). This filtering eliminates half of the samples from the original time domain signal, which further halves time resolution and doubles the frequency resolution, because the frequency band of the filtered signal spans only half the frequency band of the original signal. The aforementioned procedure (also known as subband coding), is repeated until such only two samples are left in the signal. The samples are processed and the time/frequency series representation signal is reconstructed through reconstruction 299 of the circuit that includes the low pass filter 274, and the 'n' levels including the high pass filter 284 of level 1, the high pass filter 280 and the low pass filter 282 of level 2, until reaching the high pass filter 276 of level n. The reconstruction includes up sampling of the samples. The obtained signal is a reconstructed signal 292, from which the signatures are extracted using feature extraction 294. The reconstructed signal may be further tested or trained at 296.

In step 208, once the informative signatures are extracted, the intelligent LVRT detector 110 normalizes the informative signatures by scaling the set of LVRT condition data to generate the normalized informative signatures. In step 210, the intelligent LVRT detector 110 stores the normalized informative signatures in the database with a fault type related to each LVRT condition. For example, based on the voltage sag condition, the normalized value may represent equivalent informative signatures for the voltage sag condition. Similarly, based on the overvoltage condition, the normalized value may represent equivalent informative signatures for the overvoltage condition. Hence, a first fault type such as the voltage sag condition as well as a second fault type such as the overvoltage condition is stored in the database along with the condition of the grid voltage $v_g$.

Once the fault types related to each LVRT condition are stored in the database, in step 212, the intelligent LVRT detector 110 determines a set of principal components of the normalized informative signatures. In step 214, the intelligent LVRT detector 110 estimates a nonlinear relationship between each principal component and an associated fault class by an intelligent learning algorithm. Further, based on the nonlinear relationship between each principal component and an associated fault class, in step 216, the intelligent LVRT detector 110 generates a trained classifier model for LVRT detection. Accordingly, the intelligent LVRT detector 110 generates a trained classifier to learn various fault conditions, that is, voltage sag or overvoltage, during the training process along with the corresponding voltage levels of the utility grid $V_g$.

Steps 218 to steps 228 are described using the trained classifier for LVRT detection and reactive power control. Once the intelligent LVRT detector 110 generates the trained classifier, the intelligent LVRT detector 110 learns various fault ride-through conditions due to voltage sag or voltage swell/overvoltage and also learns the requirements for injecting either the active power, reactive power or both to the system 100 to stabilize the system 100 and to prevent temporary disconnection of the utility grid 102. Based on the learning, the intelligent LVRT detector 110 can identify a real time voltage sag or overvoltage from the current data. Accordingly, in step 218, the intelligent LVRT detector 110 is configured to receive a set of measured variables, that is, vs, or voltage at the point of common coupling ($V_{PCC}$). The intelligent LVRT detector 110 simulates the load variation during the at least one time period including the one or more of the grid voltage sag and the voltage reduction. For example, the voltage $v_g$ at the point of common coupling is detected. The intelligent LVRT detector 110 simulates the voltage $v_g$ and its effect over the load variation. At step 220, the intelligent LVRT detector 110 generates a time/frequency series representation of the measured voltage for each type of load variation. At step 222, the intelligent LVRT detector 110 performs a time/frequency-domain analysis of the network variables for different LVRT conditions which is carried out with dimensionality reduction techniques. The dimensionality reduction technique transforms the raw signals into informative signatures for training with an intelligent learning algorithm. The intelligent LVRT detector 110 performs a dimensionality reduction of the time/frequency series representation. At step 224, the intelligent LVRT detector 110 normalizes the time/frequency series representation by scaling the measured variables for each load variation to generate a normalized time/frequency series representation of the measured variables.

At step 226, the normalized time/frequency series representations of the measured variable are then applied to the trained classifier. As the trained classifier has learned the various LVRT conditions based upon its previous classified learning data stored in the database, in step 228, the intelligent LVRT detector 110 determines the real time LVRT status of the connection of the distributed generation circuit with the utility grid 102. The intelligent LVRT detector 110 accordingly identifies the presence of the voltage sag or overvoltage in the utility grid 102. If the intelligent LVRT detector 110 confirms the presence of voltage sag or overvoltage in the utility grid 102, as an LVRT condition, the intelligent LVRT detector 110 identifies a necessary generation of either the active power, reactive power or both in order to stabilize the system 100 and prevent the temporary disconnection of the utility grid 102, as per the requirement of the grid code. Accordingly, the intelligent LVRT detector 110 calculates an active power reference value and a reactive power reference value based on the detected LVRT condition. For example, if low voltage within a certain voltage range, for example, $\pm u_1\%$ from the nominal defined voltage level $v_n$ is detected, the trained classifier of the intelligent LVRT detector 110 identifies the requirement of injecting only an active power to the utility grid 102. Here, $\pm u_1$ may refer to 5% to 6% of the nominal voltage of the $v_g$. Similarly, low voltage within a certain voltage range, say $\pm u_2\%$ but above $\pm u_1\%$ from the nominal defined voltage level $v_n$ is detected, the trained classifier of the intelligent LVRT detector 110 identifies the requirement of injecting both, an active power as well as the reactive power to the utility grid 102. Here, $\pm u_2$ may refer to 50% or 60% of the nominal defined voltage level $v_n$. Similarly, a high voltage transient above the voltage range, for example, $\pm u_2\%$ from the nominal defined voltage level $v_n$ is detected, the trained classifier of the intelligent LVRT detector 110 identifies the requirement of injecting only reactive power to the utility grid 102. Accordingly, the intelligent LVRT detector 110 calculates a reactive power reference value and an active power reference value based on the detected LVRT condition.

Once the LVRT status is detected and the active power reference value and the reactive power reference value is calculated, in step 230, the intelligent LVRT detector 110 transmits the active power reference value, the reactive power reference value and the LVRT status signal to the intelligent reactive power controller 112 to restore the utility grid 102.

Design synthesis is the process of taking the functional architecture developed in a functional analysis and allocation step and decomposing those functions into a physical architecture (a set of product, system, and/or software elements) that satisfy system required functions.

Figure 2B:
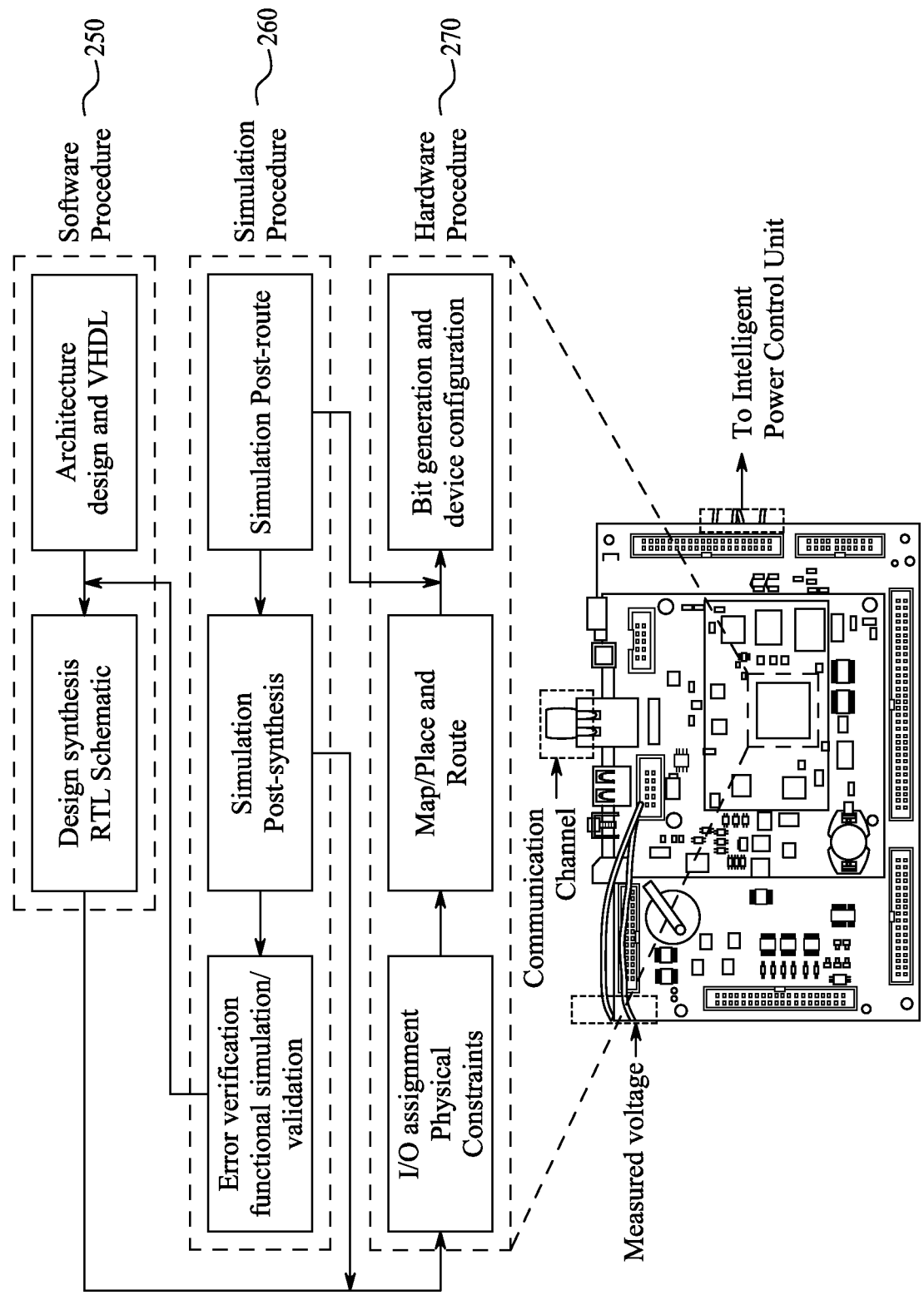
FIG. 2B is an exemplary design for an intelligent low voltage ride-through detector, according to certain embodiments.
Figure 2C:
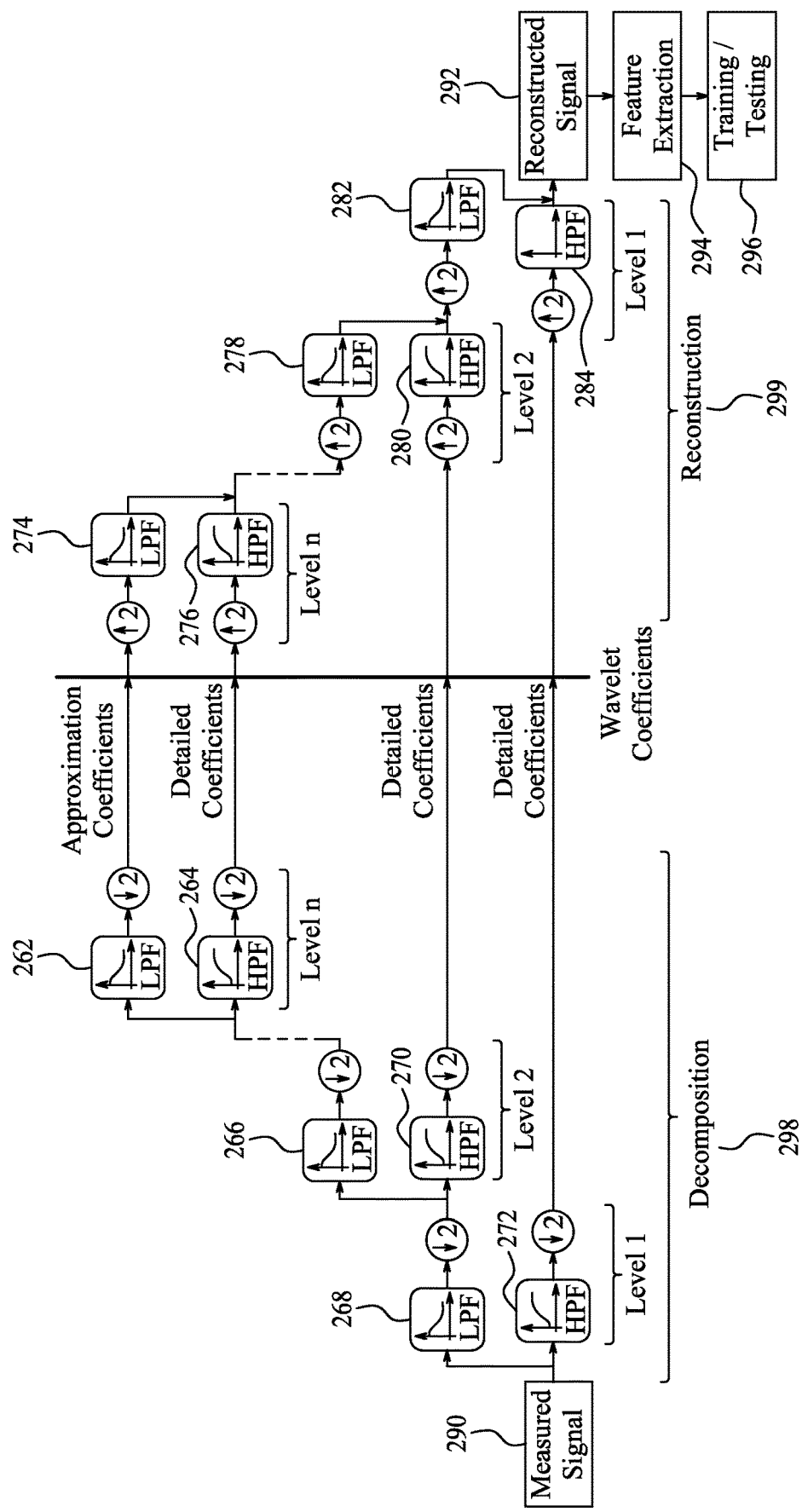
FIG. 2C is an exemplary circuit having a set of low pass filters and a set of high pass filters, according to certain embodiments.

FIG. 2B illustrates an exemplary design synthesis for the intelligent LVRT detector 110. Initially, network variables for observing the LVRT conditions at the distributed generation circuit 106 connection point are identified. The LVRT scenarios are achieved by simulating the identified conditions in the network and their impact is assessed based on voltage ($V_{pu}$), rate of change of voltage (dv/dt), frequency (f), and rate of change of frequency (df/dt). Further, the intelligent LVRT detector 110 performs a time/frequency-domain analysis of the network variables for different LVRT conditions using the dimensionality reduction techniques. The dimensionality reduction process transforms time/frequency-domain analysis into informative signatures for training with an intelligent learning algorithm. In a training process, the informative signatures are labeled with their corresponding LVRT conditions. Further, a classification process is conducted with the informative signatures and corresponding labels by sampling the data into multiple subsets. The multiple subsets are iterated to develop the intelligent LVRT detection approach. The intelligent LVRT detection approach is communicated to a programmable array for continuous monitoring of the LVRT scenarios in the grid connected system 100. The microprocessor of the intelligent LVRT detector 110 is manufactured using three procedures before developing a final LVRT detector 110. The three procedures include a software procedure 250, a simulation procedure 260 and a hardware procedure 270. In the first stage, the software procedure 250 defines the architecture design of the intelligent LVRT detector 110 along with design synthesis using, for example, a register transfer level (RTL) schematic. The intelligent LVRT detection approach of the present disclosure using a learning-based, trained classifier is represented with the RTL architecture schematic in VHSIC hardware description language (VHDL). In the second stage, the simulation procedure 260 defines simulation post route followed by the simulation post-synthesis and the error verification functional validation/simulation of the intelligent LVRT detector 110. Here, the intelligent LVRT detection approach is simulated with array gates to develop a validation and error verification function. In the third stage, the hardware procedure 270 includes I/O assignment physical constraint followed by the map/placing, route, bit generation and the device configuration. The register transfer level architecture schematic is then mapped with the programmable logic array to integrate with the measurement circuit at the point of common coupling of the utility grid 102.

Figure 3A:
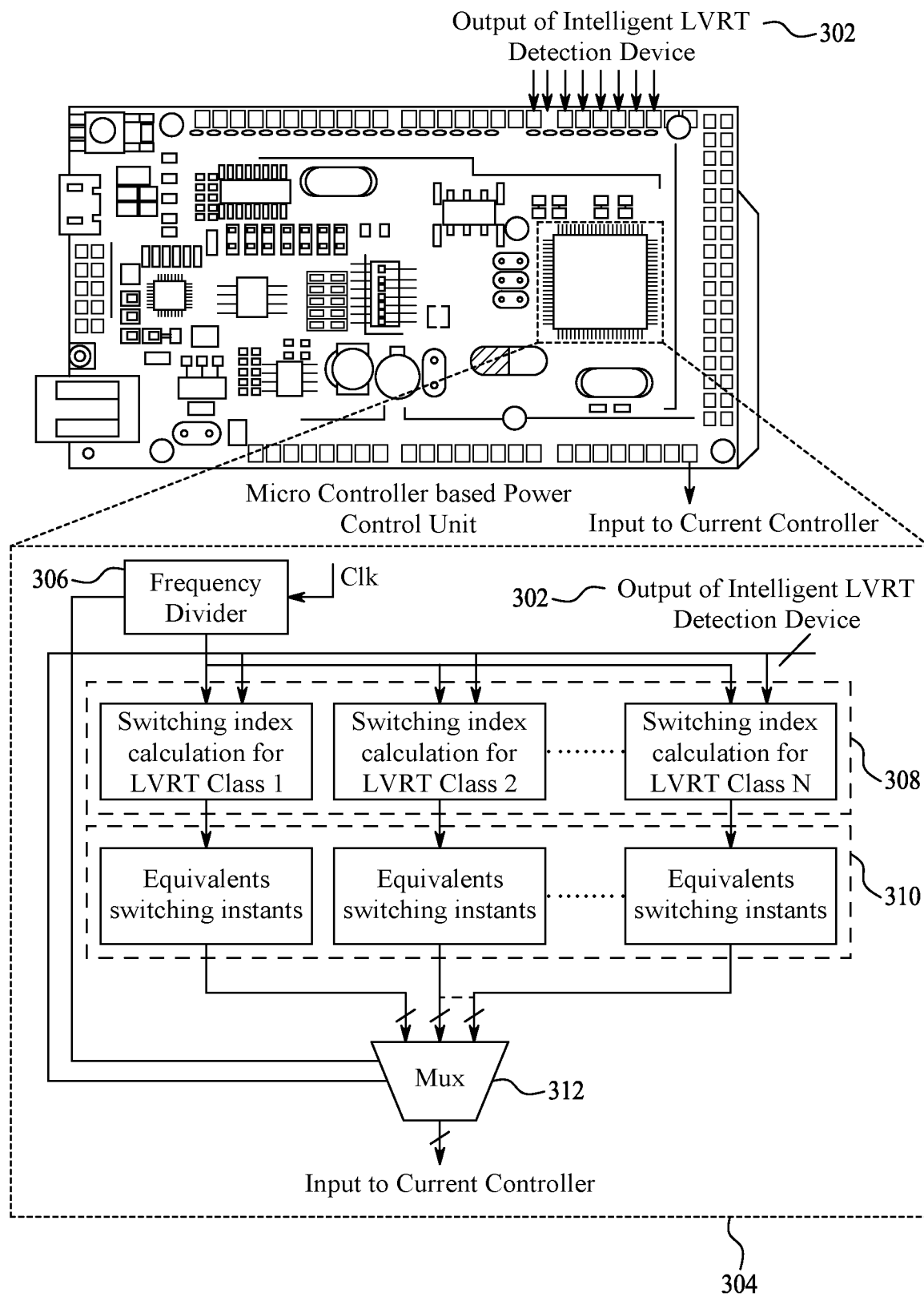
FIG. 3A is an exemplary design for an intelligent reactive power control unit, according to certain embodiments.
Figure 3B:
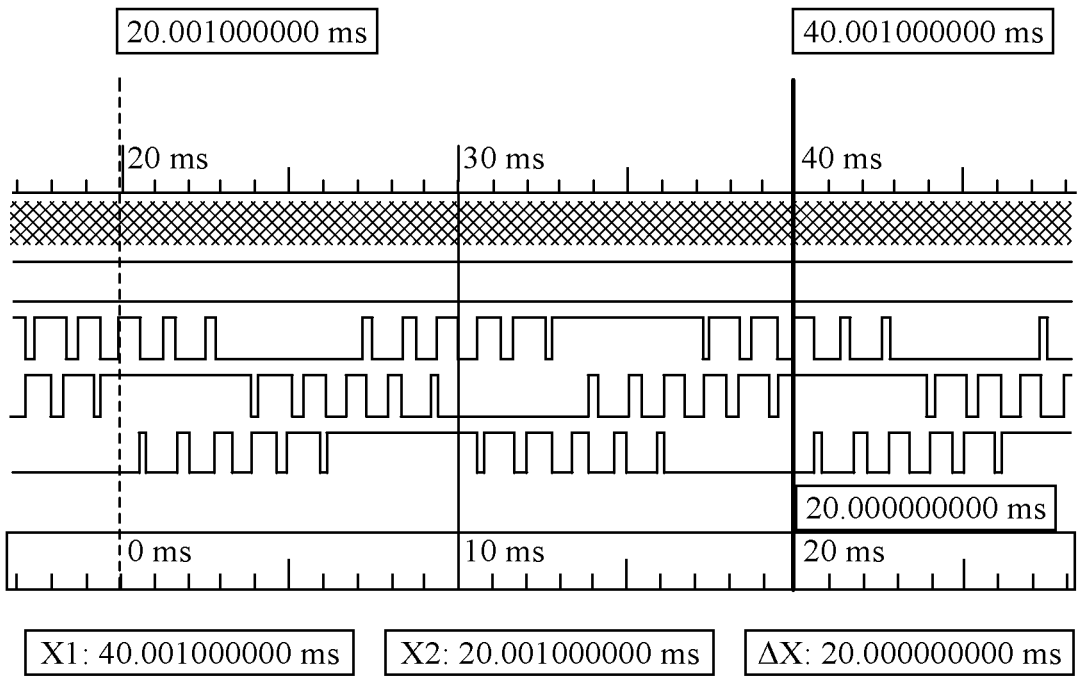
FIG. 3B is a graph of switching indices for power modules in a top leg of an inverter, according to certain embodiments.
Figure 3C:
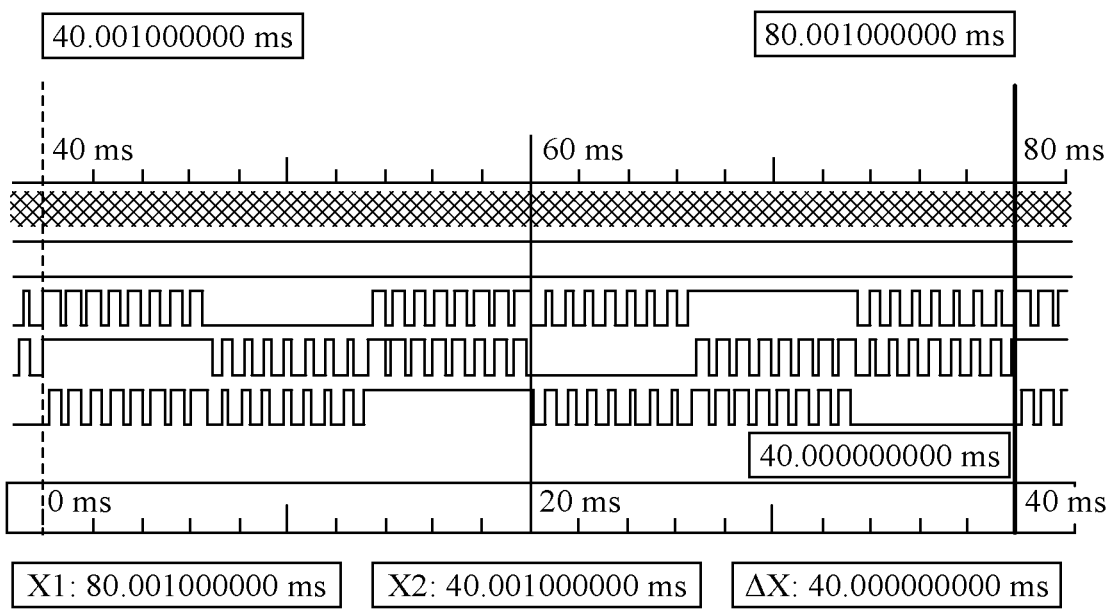
FIG. 3C is a graph of switching indices for power modules in a bottom leg of the inverter, according to certain embodiments.

FIG. 3A illustrates an exemplary design synthesis of the intelligent reactive power controller 112. The intelligent reactive power controller 112 includes an input 302 connected to the intelligent LVRT detector 110. Initially, the intelligent LVRT detector 110 detects the per unit voltage at the point of common connection and identifies the LVRT status. The intelligent LVRT detector 110 communicates the LVRT status signal along with the reference active power and the reference reactive power to the input of the intelligent power controller 112. In the example of FIG. 3A, the intelligent reactive power controller 112 is implemented as a semiconductor chip having a microcontroller 304. The microcontroller 304, is configured to process the LVRT status signal, the reference active power and the reference reactive power. The microcontroller 304 includes a frequency divider 306 configured to generate a plurality of frequencies. The microcontroller 302 further includes a programmable logic array configured to mix each of the plurality of frequencies with the LVRT status signal and generate a plurality of switching indexes 308 divided by class based on the frequency and the LVRT status. As illustrated in FIG. 3A, switching indexes for LVRT classes 1-N are generated. The switching indexes 308 are calculated using, for example, VHDL language via the ISE Xilinx tools. The LVRT classes correspond to the different types of grid faults that can create a disturbance in operation and trigger the inverter 124 to operate in grid supporting mode. These classes may be numbered either way starting from low voltage faults at 0.8 pu or from high voltage faults at 1.1 pu, where reactive power injection supports the system 100 operation. The MPPT circuit 154 may estimate the switching indexes 308 as implemented by following steps of: measurement, $\alpha\beta \rightarrow dq$ transformation, calculation of a converter voltage and calculation of the inverter voltage vectors. The measurement includes the grid voltage, $V_g$; the grid currents, $i_g$; and the dc-link voltage $V_{dc}$. The $\alpha\delta \rightarrow dq$ transformation includes using the estimated grid voltage angle provided by the phase locked loop 164. The calculation of the converter voltage includes using the d and q axes current reference for a single computation of the required converter voltages as given by:

$$\begin{bmatrix} V_{id}(k) \\ V_{iq}(k) \end{bmatrix} = \Psi \begin{bmatrix} i^*_{gd}(k) \\ i^*_{gq}(k) \end{bmatrix} - \Upsilon_1 \begin{bmatrix} i_{gd}(k) \\ i_{gq}(k) \end{bmatrix} - \Upsilon_2 \begin{bmatrix} V_{gd}(k) \\ V_{gq}(k) \end{bmatrix};$$

where, $V_{id}(k)$, and $V_{iq}(k)$ are the dq components of the inverter voltage, k corresponds to a class number, $\Psi$ indicates the inverse of a discrete time representation for the dq axis inverter currents and can be obtained from the grid current dynamics in a natural frame, $\Upsilon_1$ is the product of P and phase angle, $\Upsilon_2$ is the product of P and discrete time representation for the dq axis grid currents, $i_{gd}(k)$ and $i_{gq}(k)$ are the dq components of the grid current. The * in superscript indicates the reference value obtained from the normal operation of the system, and $V_{gd}(k)$ and $V_{gq}(k)$ are the dq components of the grid voltage. The calculation of the inverter voltage vectors includes building the matrix of voltage vectors that is related to the converter switching states using all possible d and q voltage vectors delivered by the inverter on dq-frame. Based on the above steps the switching indexes 308 are calculated for each class. An example of switching indices for class 1 identifying the low voltage fault at 0.8 pu is shown in FIG. 3B and FIG. 3C. FIG. 3B indicates the switching index for top power modules in a top leg of the inverter 124 and the FIG. 3C indicates the switching index for bottom power modules in a bottom leg of the inverter 124 that simultaneously operates with the top power modules during the inverter operation.

The microcontroller 302 further includes a timing circuit 310. The timing circuit 310 divides each switching index into a series of time instances for each class. The microcontroller 302 further includes a multiplexer 312. The multiplexer 312 mixes the equivalent time instances, the active power reference value, the reactive power reference value, the plurality of frequencies and the LVRT status signal, thereby generating an updated active power reference value and an updated reactive power reference value.

Initially, the per unit voltage $V_{pu}$ is estimated at the grid integration point, that is the point of common coupling, and the fault ride-through is identified with the developed intelligent LVRT detector 110. As the LVRT condition gets detected, the intelligent LVRT detector 110 estimates the requirements to balance the active power and the reactive power references as given by:

$$\begin{cases} -u_1\% < V_{pu} \leq v_n \Rightarrow \begin{cases} Q^*_g = 0 \\ P^*_g = P_{rated} \end{cases} \\ -u_2\% < V_{pu} \leq u_1\% \Rightarrow \begin{cases} P^*_g = P_{rated}(1 - V_{pu}) \\ P^*_g = \sqrt{P^2_{rated} - Q^2_{rated}} \end{cases} \\ \begin{cases} Q^*_g = P_{rated} \\ P^*_g = 0 \end{cases} \end{cases}$$

Here $P_g^*$ and $P_g^*$ are the active and reactive power references, respectively, and $P_{rated}$ and $Q_{rated}$ are the rated active and reactive power, respectively. Further, based on a magnitude of $V_{pu}$, the reference power signal generation is categorized into three scenarios. In a first case the reference signal generation adheres to the limits of $V_{pu}$ which lies between $\pm u_1\%$ from the $v_n$. This case may require the injection of active power into the inverter controller 148 to maintain a fixed apparent power in the utility grid 102, as shown below.

$$-u_1\% < V_{pu} \leq v_n \Rightarrow \begin{cases} Q^*_g = 0 \\ P^*_g = P_{rated} \end{cases}.$$

Accordingly, the intelligent reactive power controller 112 generates an updated active power reference value by using the frequency divider 306, switching index calculation for each class 308, and the equivalent switching instants 310.

In a second case, the $V_{pu}$ lies between $\pm u_2\%$ and $\pm u_1\%$, respectively. This scenario requires the injection of both active and reactive power to the inverter controller 148 to maintain a fixed apparent power in the grid-connected operation, as below:

$$-u_2\% < V_{pu} \leq u_1\% \Rightarrow \begin{cases} P^*_g = P_{rated}(1 - V_{pu}) \\ P^*_g = \sqrt{P^2_{rated} - Q^2_{rated}} \end{cases}.$$

Accordingly, the intelligent reactive power controller 112 generates an updated active power reference value as well as an updated reactive power reference value by using the frequency divider, switching index calculation for each class, and the equivalent switching instants.

In a third case, the $V_{pu}$ lies above the range of $\pm u_2\%$. This scenario requires the injection of only the reactive power to the inverter controller 148 to maintain a fixed apparent power in the utility grid 102, as shown below:

$$-u_2\% < V_{pu} \Rightarrow \begin{cases} Q_g^* = P_{rated} \\ P_g^* = 0 \end{cases}$$

Once either the updated active power, updated reactive power or both are generated, an output of the multiplexer 312 transmits the updated active power reference value and an updated reactive power reference value to the inverter controller 148.

Figure 4:
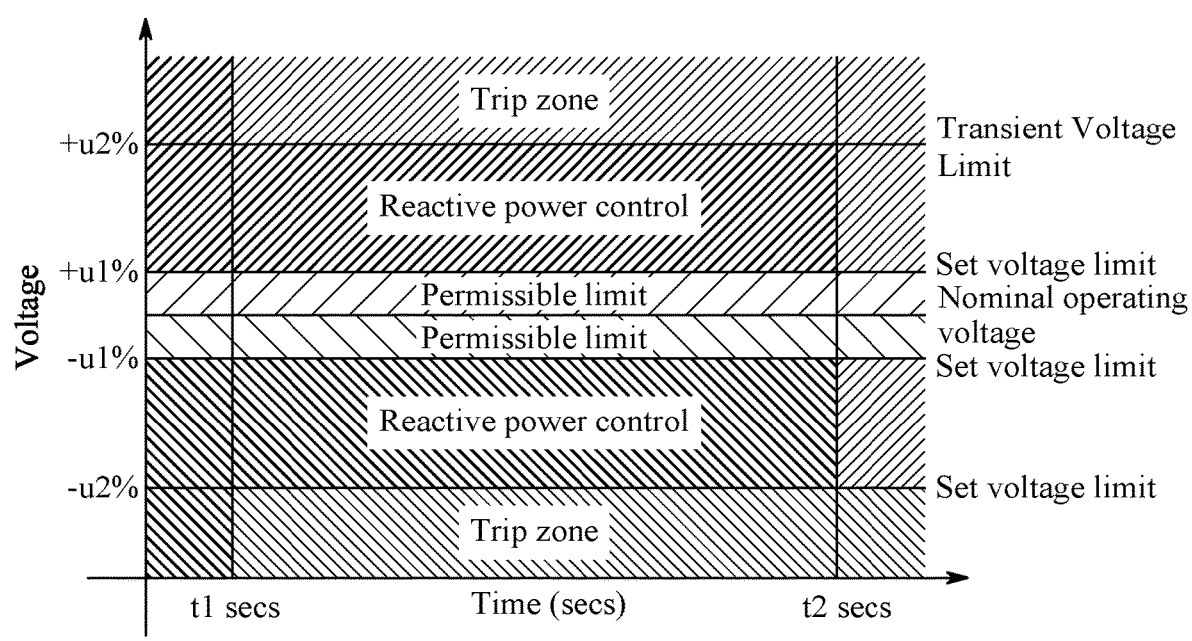
FIG. 4 is a graph showing a set voltage and duration limits for a trip signal generation unit, according to certain embodiments.

FIG. 4 is an exemplary graph showing a set voltage and duration limits for a trip signal generation unit, according to certain embodiments. The graph shows a set voltage and duration limits defined by the grid codes when it becomes necessary to support the utility grid 102 by injecting either an updated active power or an updated reactive power, or both, in response to voltage fluctuations in the form of overvoltage/voltage sag. The intelligent LVRT detector 110 also learns to generate the trip signal in order to disconnect the utility grid 102 from the distributed generator circuit 106 when the voltage fluctuations are not recovered within the specified time limits defined by the grid codes.

Case I: If a normal voltage sag/dip/overvoltage is detected and that is within the range of $\pm u_1$, it is considered to be a normal voltage fluctuation that may last for a few seconds or microseconds.

In this case, the intelligent LVRT detector 110 learns that it is not necessary to generate the trip signal: when $V_{trip} = $ [$-u1\%$ of vn<vgrid<$+u1\%$ of vn] during $t_1$ seconds and afterward. For example, small voltage fluctuation denotes a small overvoltage/small voltage sag/dip in the grid voltage $v_g$. However, these fluctuations are within the defined permissible range, i.e., within $\pm u_1$. The intelligent LVRT detector 110 determines that the system 100 can adjust itself by injecting an updated active power P to the system 100. This injection is done only by the MPPT circuit 154. This injection can stabilize the utility grid 102, and the temporary disconnection of the utility grid 102 is avoided. This injection keeps the utility grid 102 within a permissible operating range without disconnecting from the distributed generator circuit 106. During a normal operating state of the utility grid 102, the intelligent LVRT detector 110 generates a trip signal by calculating:

$$u_{norm} = \begin{cases} 1 \ [-u_1\% \text{ of } v_n < v_{grid} < +u_1\% \text{ of } v_n] \\ 0 [+u_1\% \text{ of } v_n < v_{grid} < +u_1\% \text{ of } v_n > v_{grid}] \end{cases} \text{ in } t_1 \text{ seconds;}$$

where $u_{norm}$ indicates the trip signal generation under the normal operating state, the nominal operating voltage of the system is given as $v_n$, and the grid voltage is given by $v_{grid}$. The voltage limits for identifying the different ranges of system operation are specified with $\pm u_1$.

Case II: The trip signal $V_{trip}$ is generated when $V_{trip}$=[+u1% of $v_n$<vgrid or $-u1\%$ of vn>vgrid] for a time period of $t_1$ seconds and after $t_1$. For example, small voltage fluctuations denote a small overvoltage/small voltage sag/dip in the grid voltage that now lies above $+u_1\%$ but below the $+u_2\%$ (high limit transients) OR the grid voltage that now lies below $-u_1\%$ but above $-u_2\%$ (lower limit transients). However, these fluctuations are outside the defined permissible range. The intelligent LVRT detector 110 learns that the system 100 can adjust by injecting an active power P* (Pg*=√Prated2−Qrated) as well as a reactive power Qg*=2Prat(1−Vpu) to the system. The intelligent LDVT detector 110 also continues to monitor the duration of the voltage sag/overvoltage. The updated active power is injected by the MPPT circuit 154, whereas the updated reactive power is injected by the current controller 160 based on the updated reactive power from the intelligent reactive power controller 112. This injection can stabiles the utility grid 102, and the temporary disconnection is avoided only if the system stabilizes before $t_1$ seconds. However, after injecting the updated active power as well as the updated reactive power to the system 100 till $t_1$ seconds, if the system 100 does not restore itself back to its normal operating conditions, the trip signal is generated by the LVRT controller 110 that disconnects the utility grid 102 from the distributed generation circuit 106.

Case III: Includes high voltage transients (above $\pm u_2$) in which the trip signal $V_{trip}$ is generated (during a high signal transient) when Vtrip=[+u2% of $v_n$<vgrid or $-u2\%$ of vn>vgrid] for $t_2$ seconds and afterward. For example, high voltage fluctuations (high voltage transients) denote a large overvoltage/large voltage sag/dip transients in the grid voltage that now lies above $+u_2\%$ OR below the $-u_2\%$. The intelligent LVRT detector 110 learns that the system 100 can adjust itself by injecting only a reactive power Q*=Prated to the system 100. The LDVT detector 110 also keeps on monitoring the duration of the voltage sag/overvoltage. This injection is performed only by the current controller 160 based on the updated reactive power from the intelligent reactive power controller 112. This injection stabilizes the utility grid 102, and the temporary disconnection is avoided if the system stabilizes before $t_2$ seconds. However, in the situation where injecting the reactive power Q* to the system 100 for $t_2$ seconds does not restore the system to normal conditions, a trip signal is generated that disconnects the utility grid 102 from the distributed generation circuit 106. For varying load conditions:

$$u_{trans} = \begin{cases} 1 \ [-u_2\% \text{ of } v_n < v_{grid} < +u_2\% \text{ of } v_n] \\ 0 [+u_2\% \text{ of } v_n < v_{grid} < -u_1\% \text{ of } v_n > v_{grid}] \end{cases}$$

where, $\pm u_2\%$ defines the transient operation limits for the utility grid 102 connected with the distributed generation circuit 106.

Figure 5A:
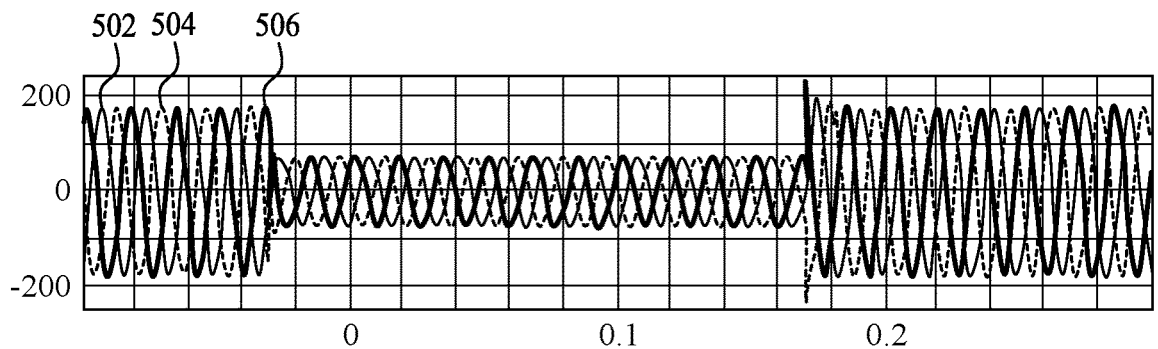
FIG. 5A is a graph illustrating a measured voltage response of a control unit during voltage sag, according to certain embodiments.

FIG. 5A-5D are diagrams of a measured voltage $v_g$ and current $i_g$ during the voltage sag and voltage swell for the response of the control unit. FIG. 5A illustrates a graph for the measured voltage $v_g$ at the point of common coupling $V_{PCC}$ at the time of voltage sag/dip. In this case, a momentary voltage sag is detected by the voltage and current measurement unit 108. As soon as the voltage sag is detected and if it is within the permissible and predefined voltage fluctuation range say $\pm u_1\%$, the intelligent LVRT detector 110 learns to generate an active power only and forwards this active power to the intelligent reactive power controller 112 for an updated active power for stabilizing the system 100 into a normal operating voltage. However, if the voltage sag is detected and if it is outside the predefined voltage fluctuation range $\pm u_1$ but below $\pm u_2$ voltage range, the intelligent LVRT detector 110 adjusts the system by the generating active power reference value as well as the reactive power reference value which are forwarded to the intelligent reactive power controller 112 to generate an updated active power and an updated reactive power for stabilizing the system 100 into a normal operating voltage.

In this case, the intelligent LVRT detector 110 simultaneously measures the time duration such as $t_1$ during which the voltage sag is detected. Upon injecting the updated active power and the updated reactive power, if the system 100 does not recover within $t_1$ seconds, the intelligent LVRT detector 110 generates a trip signal which is forwarded to the 3-phase grid circuit breaker 104 for disconnecting the utility grid 102 from the distributed generation circuit. FIG. 5A illustrates a signal 502 corresponding to $V_a$, a signal 504 corresponding to $V_b$, and a signal 506 corresponding to $V_c$. FIG. 5A illustrates a scenario where the voltages are measured for the action of the developed LVRT detector 110 during voltage sag.

Figure 5B:
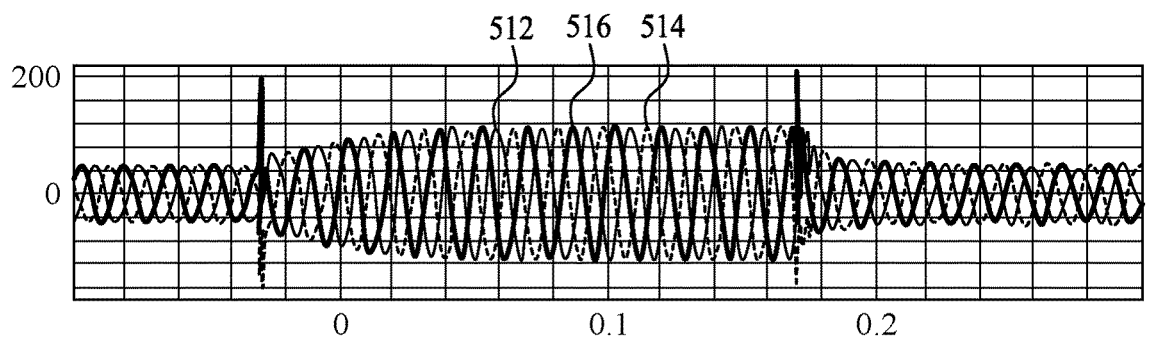
FIG. 5B is a graph illustrating a measured current for the response of a control unit during voltage sag, according to certain embodiments.

FIG. 5B illustrates a signal 512 corresponding to $I_a$, a signal 514 corresponding to $I_b$, and a signal 516 corresponding to $I_c$. FIG. 5B illustrates a scenario where the voltages are measured for the action of the LVRT detector 110 during voltage sag.

Similarly, FIG. 5B denotes the measured current $i_g$ at the point of common coupling $V_{PCC}$ at the time of voltage sag.

Figure 5C:
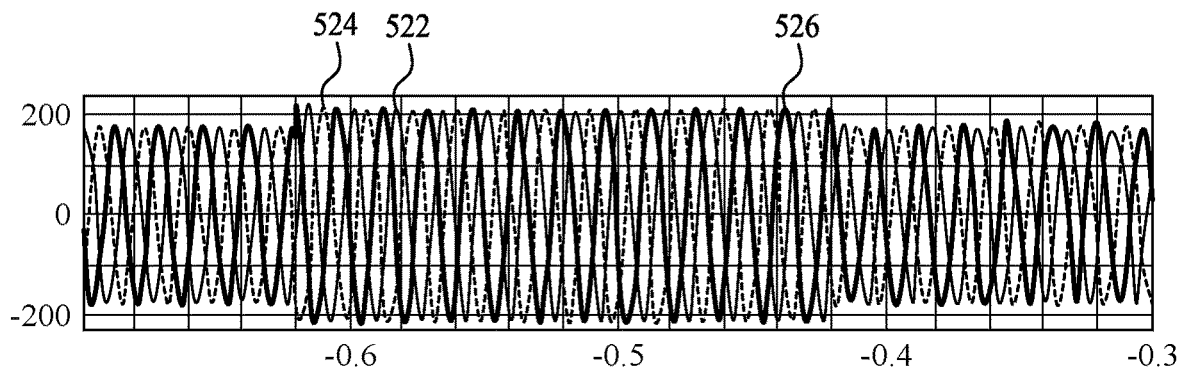
FIG. 5C is a graph illustrating a measured voltage for the response of a control unit during voltage swell, according to certain embodiments.

FIG. 5C denotes the measured voltage $v_g$ at the point of common coupling $V_{PCC}$ at the time of voltage swell. In this case, a momentarily voltage swell is detected by the voltage and current measurement unit 108. As soon as the voltage swell is detected it is confirmed that it is outside the predefined voltage fluctuation range, say outside $\pm u_1$ but below $\pm u_2$, the intelligent LVRT detector 110 learns to generate an active power as well as reactive power and forwards this active power and the reactive power to the intelligent reactive power controller 112 for an updated active power and the reactive power for stabilizing the system 100 into a normal operating voltage. The intelligent LVRT detector 110 simultaneously measures the duration of the voltage swell, for example $T_1$ during which the voltage swell is detected. Upon injecting the updated active power and the updated reactive power, if the system 100 does not recover within $T_1$ seconds, the intelligent LVRT detector 110 generates a trip signal which is forwarded to 3-phase grid circuit breaker 104 for disconnecting the utility grid 102 from the distributed generation circuit 106. Also, if the measured voltage is outside the predefined voltage range say $\pm u_2$, it is considered to be an overvoltage/voltage transient. It this case, the intelligent LVRT detector 110 learns to generate a reactive power only and forward this reactive power to the intelligent reactive power controller 112 for an updated reactive power for stabilizing the system 100 into a normal operating voltage. The intelligent LVRT detector 110 simultaneously measures the duration of the voltage swell, for example $T_2$ seconds during which the voltage swell is detected. Upon injecting the updated reactive power, if the system 100 does not recover within $T_2$ seconds, the intelligent LVRT detector 110 generates a trip signal which is forwarded to the 3-phase grid circuit breaker 104 for disconnecting the utility grid 102 from the distributed generation circuit 106.

FIG. 5C illustrates a signal 522 corresponding to $V_a$, a signal 524 corresponding to $V_b$, and a signal 526 corresponding to $V_c$. FIG. 5C illustrates a situation where the voltages are measured for the action of the LVRT detector 110 during voltage swell.

Figure 5D:
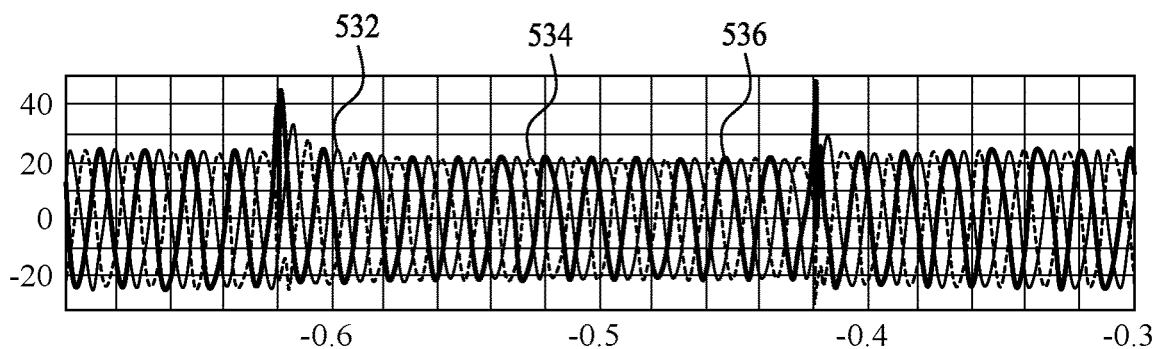
FIG. 5D is a graph illustrating a measured current for the response of a control unit during voltage swell, according to certain embodiments.

FIG. 5D illustrates a signal 532 corresponding to $I_a$, a signal 534 corresponding to $I_b$, and a signal 536 corresponding to $I_c$. FIG. 5B illustrates a scenario where the currents are measured for the action of the developed LVRT detector 110 during voltage sag.

Similarly, FIG. 5D denotes the measured current $i_g$ at the point of common coupling $V_{PCC}$ during a voltage swell.

Figure 6:
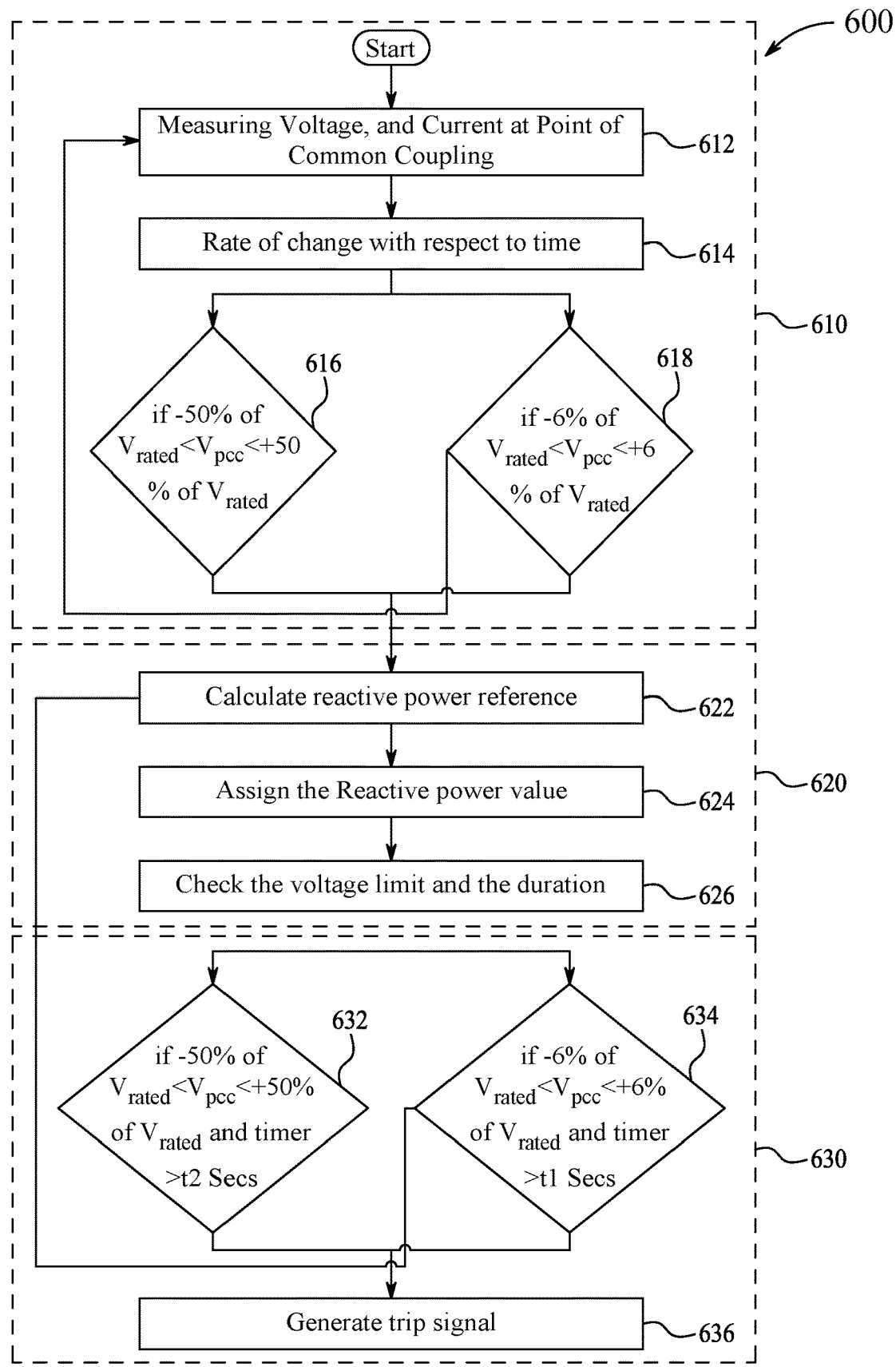
FIG. 6 is a flow chart for active and reactive power control of a low voltage ride-through in a grid connected distributed generation system with generation of a trip signal, according to certain embodiments.

FIG. 6 is a flow chart of a method 600 for active and reactive power control of a low voltage ride-through at a utility grid 102 connected distributed generation system and generation of a trip signal. The flow chart is described with reference to the FIG. 1 to FIG. 5. The method 600 has steps divided into three blocks, that is: block 610, block 620 and block 630. The block 610 corresponds to steps by the voltage and current measurement unit 108. The block 620 corresponds to operations performed by the intelligent reactive power controller 112. The block 630 corresponds to operations performed by the inverter controller 148.

Step 612 includes measuring a voltage $v_g$ and a current $i_g$ of each of the 3-phase connectors and generating a set of measured variables. As such, the voltage and current measurement unit 108 measures the voltage $v_g$ and current $i_g$ at the point of common coupling ($V_{PCC}$ and $I_{PCC}$).

Step 614 of identifying the rate of change of voltage and frequency at the point of common coupling. As such, the voltage and current measurement unit 108 identifies if any voltage sag or overvoltage is detected, and if detected what is the rate of change of voltage, i.e. v and dv/dt. The voltage and current measurement unit 108 also determines the frequency of the 3-phase supply as well as rate of change of frequency at the point of common coupling i.e. f and df/dt.

Based on the measurement of voltage, current and the frequency at the point of common coupling, the method 600 further includes identifying, by an intelligent LVRT detector 110, a LVRT status of the utility grid 102. As such, the intelligent LVRT detector 110 identifies if a voltage sag or overvoltage is detected in the utility grid 102. If a voltage sag or over voltage is detected, the intelligent LVRT detector 110 is further configured to determine if the voltage sag or overvoltage is within the defined nominal voltage limits or the transient voltage limit as defined in the grid codes.

For example, step 616 includes determining whether −50% of $V_{rated} < V_{PCC} <$ 50% of $V_{rated}$ for transient voltage; OR step 618 includes determining whether −6% of $V_{rated} < V_{PCC} <$ 6% of $V_{rated}$ for normal voltage variation.

If the step 616 condition is true, the intelligent LVRT detector 110 identifies an existence of a transient voltage in the utility grid 102 that needs to be stabilized by injecting only a reactive power to the system 100. Similarly, if the step 618 condition is true, the intelligent LVRT detector 110 identifies an existence of a normal voltage variation in the utility grid 102 that needs to be stabilized by injecting both the active power and the reactive power to the system 100. If the step 618 condition is false, the intelligent LVRT detector 110 reverts to step 612 to continue measuring the voltage $v_g$ and the current $i_g$ and the process continues.

Based on the status of the LVRT, the method 600 further includes a step 622 of calculating the active power reference value and the reactive power reference value, based on the identified LVRT status of the utility grid 102. The intelligent LVRT detector 110 calculates the reactive power reference value if the step 616 condition is true. Also, the intelligent LVRT detector 110 calculates the active power reference value and the reactive power reference value if the step 618 condition is true.

Once the active power reference value and the reactive power reference values are calculated, the method 600 further includes a step 624 of assigning the active power reference value and the reactive power reference value, in order to stabilize the utility grid 102. As such, the intelligent LVRT detector 110 communicates the LVRT status signal that is received by the intelligent reactive power controller 112. In one or more implementations, along with the LVRT status signal, the intelligent LVRT detector 110 also communicates the active power reference value and the reactive power reference value to the intelligent reactive power controller 112.

Based on the LVRT status signal, the method 600 further includes a step 626 of checking the voltage limit and durations as well as controlling a LVRT during at least one time period including one or more of a grid voltage sag and a voltage reduction by transmitting one or more of an active power reference value and a reactive power reference value to the distributed generation circuit based on the LVRT status signal. As such, the intelligent reactive power controller 112, calculate an updated active power reference value and the updated reactive power reference value based on the LVRT status and the active power and the reactive power value from the intelligent LVRT detector 110. If the first condition is detected, the intelligent reactive power controller 112 injects an updated active power reference value as well as an updated reactive power reference value. For example, if the disturbance in the utility grid 102 is identified and it is within the range of $\pm u_2$ as described in the FIG. 4, the intelligent reactive power controller 112 injects both, the updated active power and the updated reactive power to the inverter controller 148 till $t_1$ seconds. Similarly, if the disturbance in the utility grid 102 is identified and it is outside the range of $\pm u_2$ as described in the FIG. 4, the intelligent reactive power controller 112 injects only the updated reactive power to the inverter controller 148 till $t_2$ seconds. Similarly, if the disturbance in the utility grid is identified and it is within the range of $\pm u_1$ as described in the FIG. 4, the intelligent power controller injects only the updated active power to the inverter controller 148. Accordingly, LVRT during at least one time period, i.e., either $t_1$ or $t_2$ seconds, for the voltage sag or overvoltage is stabilized. Also, during the LVRT condition, the intelligent LVRT detector 110 also keeps on monitoring the voltage limits and the duration of the persistence of the LVRT condition in the utility grid 102.

The method 600 further includes a step 630 of generating and communicating a trip signal to a 3-phase grid circuit breaker 104 connected to the set of 3-phase connectors of the utility grid 102 to turn off the 3-phase grid circuit breaker 104 when a LVRT status is detected in which the low voltage persists for a duration greater than a preset time limit of monitoring the duration of the persistence of the LVRT status. As such, if an overvoltage beyond $\pm u_2$ voltage range for at least $t_2$ seconds is detected and injecting the reactive power to the inverter controller 148 the system 100 does not stabilize the system, the intelligent LVRT detector 110 generates and sends a trip signal to the 3-phase grid circuit breaker 104 connected to the set of 3-phase connectors of the of the utility grid 102. Similarly, if a voltage sag within $\pm u_1$ voltage range but below $\pm u_2$ voltage range is detected for at least $t_1$ seconds and if injecting the updated active and reactive power to the inverter controller 148 the system 100 does not stabilize the system, the intelligent LVRT detector 110 generates and sends a trip signal to the 3-phase grid circuit breaker 104 connected to the set of 3-phase connectors of the of the utility grid 102.

The first embodiment is illustrated with respect to FIG. 1 to FIG. 9. The first embodiment describes an artificial intelligence reactive power control system for low voltage ride-through in a grid connected distributed generation network.

The artificial intelligence reactive power control system 100 for LVRT in a grid connected distributed generation network includes the utility grid 102, a 3-phase grid circuit breaker 104 connected to the utility grid 102, the distributed generation circuit 106 including 3-phase terminals connected to the 3-phase grid circuit breaker 104, the voltage and current measurement unit 108 connected to the 3-phase terminals, the voltage and current measurement unit 108 configured to generate a set of measured variables, ($i_g$, $v_g$), the intelligent LVRT detector 110 configured to receive the set of measured variables and identify a LVRT status of the utility grid 102, an intelligent reactive power controller 112 connected between the intelligent LVRT detector 110 and the distributed generation circuit 106, the intelligent reactive power controller 112 is configured to receive a LVRT status signal from the intelligent LVRT detector 110, control a low voltage ride-through during one or more of a grid voltage sag and a voltage reduction by transmitting one or more of an active power reference value and a reactive power reference value to the distributed generation circuit based on the LVRT status signal.

The distributed generation circuit 106 includes the distributed energy generator 114, the boost converter 116 connected to the distributed energy generator 114, the boost converter 116 including the first inductor 118, the first switch 120, and the first capacitor 122 in parallel with the first switch 120, the inverter 124 is connected to the boost converter 116, the inverter 124 including a plurality of second switches, the 3-phase low pass filter 126 having 3-phase input connectors connected to the inverter and the 3-phase output terminals of the utility grid 102 connected to the 3-phase grid circuit breaker 104, an inverter controller 148, and the MPPT circuit 154 having a MPPT input connected to receive a voltage, $v_{pv}$, and a current, $i_{pv}$, from the distributed energy generator 114, an MPPT control output 156 is connected to the first switch of the boost converter 116, and an MPPT power setpoint output line 158, p*, connected to the inverter controller 148.

The voltage and current measurement unit 108 includes a terminal voltage monitor configured to identify one or more of a grid voltage sag and a voltage reduction in the distributed generation circuit 106, a current monitor configured to measure a load variation during at least one time period including the one or more of the grid voltage sag and the voltage reduction, and a voltage dip detection unit capable of identifying a range and a duration of the one or more of the grid voltage sag and the voltage reduction. The terminal voltage monitor and the current monitor are configured to identify the one or more of the voltage reduction and the voltage sag at selected time intervals.

The artificial intelligence reactive power control system 100 further includes the phase locked loop 164 connected between the voltage and current measurement circuit 108, and the inverter controller 148, the phase locked loop 164 including a voltage controlled oscillator, wherein the phase locked loop 164 is configured to match a phase of each measured variable of the set of measured variables to a phase of a square wave generated by the voltage controlled oscillator, generate a phase modified grid current, $i_g$ and a phase modified grid voltage, $v_g$, and transmit the phase modified grid current, $i_g$ and a phase modified grid voltage, $v_g$ to the inverter controller.

The intelligent LVRT detector 110 further includes a database including a set of LVRT condition data of the distributed generation circuit, a set of low pass filters and a set of high pass filters, wherein the intelligent LVRT detector 110 includes a microprocessor having circuitry and program instructions stored therein that, when executed by one or more processors, cause the one or more processors to: generate a time/frequency series representation of the set of LVRT condition data, filter the time/frequency series representation to generate informative signatures, normalize the informative signatures by scaling the set of LVRT condition data to generate normalized informative signatures, store the normalized informative signatures in the database with a fault type related to each LVRT condition, determine a set of principal components of the normalized informative signatures, estimate a nonlinear relationship between each principal component and an associated fault class by an intelligent learning algorithm, and generate a trained classifier for LVRT detection.

The intelligent LVRT detector 110 is further configured to simulate the load variation during the at least one time period including the one or more of the grid voltage sag and the voltage reduction, generate a time/frequency series representation of the measured variables for each load variation, normalize the time/frequency series representation by scaling the measured variables for each load variation to generate a normalized time/frequency series representation of the measured variables, apply the normalized time/frequency series representation of the measured variables to the trained classifier, determine the LVRT status of the connection of the distributed generation circuit with the utility grid, calculate an active power reference value, calculate a reactive power reference value, and transmit the active power reference value, the reactive power reference value and the LVRT status signal to the intelligent reactive power controller 112.

The intelligent LVRT detector 110 further includes a trip signal generator connected to the 3-phase grid circuit breaker 104, the trip signal generator is configured to turn off the 3-phase grid circuit breaker 104 when a LVRT status is detected in which the low voltage persists for a duration greater than a preset time limit.

The inverter controller 148 further includes a DC voltage controller 150 connected to receive a boost converter DC voltage input, $V_{dc}$, a grid synchronization circuit 152 configured to receive a DC voltage setpoint value, $V_{dc}$* and the MPPT power setpoint output line 158, P*, the current controller 160 connected to the intelligent reactive power controller 112, the current controller 160 configured to receive one or more of the active power reference value and the reactive power reference value from the intelligent reactive power controller 112, and the pulse width modulator 162 connected to the inverter 124, the pulse width modulator 162 is configured to generate drive signals based on the one or more of the active power reference value and the reactive power reference value, the drive signals configured to actuate the plurality of switches of the inverter.

The intelligent reactive power controller 112 includes: an input connected to the LVRT detector 110, the input configured to receive the LVRT status signal, a microcontroller, a frequency divider 306 configured to generate a plurality of frequencies, a programmable logic array configured to mix each of the plurality of frequencies with the LVRT status signal and generate a plurality of switching indexes divided by class based on the frequency and the LVRT status, a timing circuit 310 configured to divide each switching index into a series of time instances for each class, a multiplexer 312 configured to mix the equivalent time instances, the reactive power reference value, the active power reference value, the plurality of frequencies and the LVRT status signal, generate an updated active power reference value and an updated reactive power reference value, a multiplexor output configured to transmit the updated active power reference value and an updated reactive power reference value to the current controller 160. The class indicated for each switching index is defined based on the number of fault types considered during the learning process of the trained classifier. In the present disclosure, these classes mainly adhere to different grid side faults that include low voltage variations from 0.8 per unit to 0.1 per unit, high voltage faults that range between 1.1 per unit to 1.5 per unit, low frequency faults that range below 0.8 per unit, high frequency faults that range above 1.2 per unit, and unsymmetrical faults that include line to line (LL), line to ground (LG), line to line to ground (LLG), line to line to line (LLL), and line to line to line to ground (LLLG) fault types. The distributed energy generator 114 is a plurality of photovoltaic panel arrays and the inverter 124 is a photovoltaic inverter. The distributed energy generator 114 is any one of a plurality of photovoltaic panel arrays, a plurality of wind power turbines and a plurality of wave generators.

The plurality of second switches of the inverter includes three pairs of series-connected second switches, a first pair i.e., G1-G2 having a first common output connected to a first phase input of the 3-phase low pass filter, a second pair i.e., G3-G4 having a second common output connected to a second phase input of the 3-phase low pass filter, and a third pair i.e., G5-G6 having a third common output a third phase input of the 3-phase low pass filter.

The 3-phase low pass filter 126 includes a first phase inductor 128 connected to a first phase capacitor 130 and a first switching inductor 132, the first phase capacitor 130 connected to a neutral connection 146, a second phase inductor 134 connected to the second phase capacitor 136 and a second switching inductor 138, the second phase capacitor 136 connected to the neutral connection 146, a third phase inductor 140 connected to a third phase capacitor 142 and a third switching inductor 144, the third phase capacitor 142 connected to the neutral connection 146, and wherein an output of each switching inductor is connected a phase of the 3-phase grid circuit breaker 104.

The second embodiment is illustrated with respect to FIG. 1 to FIG. 9. The second embodiment describes a method for reactive power control of the LVRT in a grid connected distributed generation network. The method includes receiving a set of grid codes specifying rules for connecting a distributed generation circuit to a set of 3-phase connectors of a utility grid 102, measuring a voltage and a current of each of the 3-phase connectors and generating a set of measured variables, identifying, by the intelligent LVRT detector 110, a LVRT status of the utility grid 102, receiving, by the intelligent reactive power controller 112, a LVRT status signal from the intelligent LVRT detector 110, controlling a low voltage ride-through (LVRT) during at least one time period including one or more of a grid voltage sag and a voltage reduction by transmitting one or more of an active power reference value and a reactive power reference value to the distributed generation circuit 106 based on the LVRT status signal, and sending a trip signal to a 3-phase grid circuit breaker 104 connected to the set of 3-phase connectors of the utility grid 102 to turn off the 3-phase grid circuit breaker 104 when a LVRT status is detected in which the low voltage persists for a duration greater than a preset time limit. The method further includes generating a trained classifier for LVRT detection by determining a set of LVRT condition data from the set of grid codes, generating a time/frequency series representation of the set of LVRT condition data, filtering the time/frequency series representation to generate informative signatures, normalizing the informative signatures by scaling the set of LVRT condition data to generate normalized informative signatures, storing the normalized informative signatures in a database with a fault type related to each LVRT condition, determining a set of principal components of the normalized informative signatures, and estimating a nonlinear relationship between each principal component and an associated fault class by an intelligent learning algorithm.

The method further includes simulating a load variation during the at least one time period including the one or more of the grid voltage sag and the voltage reduction, generating a time/frequency series representation of the measured variables for each load variation, normalizing the time/frequency series representation by scaling the measured variables for each load variation to generate a normalized time/frequency series representation of the measured variables, applying the normalized time/frequency series representation of the measured variables to the trained classifier, determining the LVRT status of the connection of the distributed generation circuit with the utility grid 102, calculating an active power reference value, calculating a reactive power reference value, and transmitting the active power reference value, the reactive power reference value and a LVRT status signal to an intelligent reactive power controller 112 of the distributed generation circuit 106.

The method further includes receiving, by a DC voltage controller 150, the boost converted DC voltage input, $V_{dc}$, receiving, by a grid synchronization circuit 152, a DC voltage setpoint value, $V_{dc}$* and an MPPT power setpoint output line 158, p*, receiving, by the current controller 160 connected to the intelligent reactive power controller 112, the one or more of the active power reference value and the reactive power reference value, and generating, by a pulse width modulating 162 connected to an inverter 124 of the distributed generation circuit 106, drive signals based on the one or more of the active power reference value and the reactive power reference value, and actuating a plurality of switches of the inverter 124 to ride-through the one or more of the grid voltage sag and a voltage reduction.

A third embodiment is illustrated with respect to FIG. 1 to FIG. 9. The third embodiment describes a non-transitory computer readable medium having instructions stored therein that, when executed by one or more processors, cause the one or more processors to perform a method for reactive power control of a LVRT in a grid connected distributed generation network, includes receiving a set of grid codes specifying rules for connecting a distributed generation circuit to a set of 3-phase connectors of the utility grid 102, measuring a voltage and a current of each of the 3-phase connectors and generating a set of measured variables, identifying, by the intelligent LVRT detector 110, a LVRT status of the utility grid 102, receiving, by an intelligent reactive power controller 112, a LVRT status signal from the intelligent LVRT detector 110, controlling a low voltage ride-through during at least one time period including one or more of a grid voltage sag and a voltage reduction by transmitting one or more of an active power reference value and a reactive power reference value to the distributed generation circuit 106 based on the LVRT status signal, and sending a trip signal to a 3-phase grid circuit breaker 104 connected to the set of 3-phase connectors of the utility grid 102 to turn off the 3-phase grid circuit breaker 104 when the LVRT status is detected in which the low voltage persists for a duration greater than a preset time limit.

The method further includes generating a trained classifier for LVRT detection by determining a set of LVRT condition data from the set of grid codes, generating a time/frequency series representation of the set of LVRT condition data, filtering the time/frequency series representation to generate informative signatures, normalizing the informative signatures by scaling the set of LVRT condition data to generate normalized informative signatures, storing the normalized informative signatures in a database with a fault type related to each LVRT condition, determining a set of principal components of the normalized informative signatures, estimating a nonlinear relationship between each principal component and an associated fault class by an intelligent learning algorithm, simulating a load variation during the at least one time period including the one or more of the grid voltage sag and the voltage reduction, generating a time/frequency series representation of the measured variables for each load variation, normalizing the time/frequency series representation by scaling the measured variables for each load variation to generate a normalized time/frequency series representation of the measured variables, applying the normalized time/frequency series representation of the measured variables to the trained classifier, determining the LVRT status of the connection of the distributed generation circuit with the utility grid 102, calculating an active power reference value, calculating a reactive power reference value, transmitting the active power reference value, the reactive power reference value and a LVRT status signal to an intelligent reactive power controller 112 of the distributed generation circuit 106, receiving, by the DC voltage controller 150, the boost converted DC voltage input, $V_{dc}$, receiving, by a grid synchronization circuit 152, a DC voltage setpoint value, $V_{dc}$* and an MPPT power setpoint output line 158, p*, receiving, by the current controller 160 connected to the intelligent reactive power controller 112, the one or more of the active power reference value and the reactive power reference value, generating, by a pulse width modulator 162 connected to an inverter 124 of the distributed generation circuit 106, drive signals based on the one or more of the active power reference value and the reactive power reference value, and actuating a plurality of switches of the inverter 124 to ride-through the one or more of the grid voltage sag and a voltage reduction.

Figure 7:
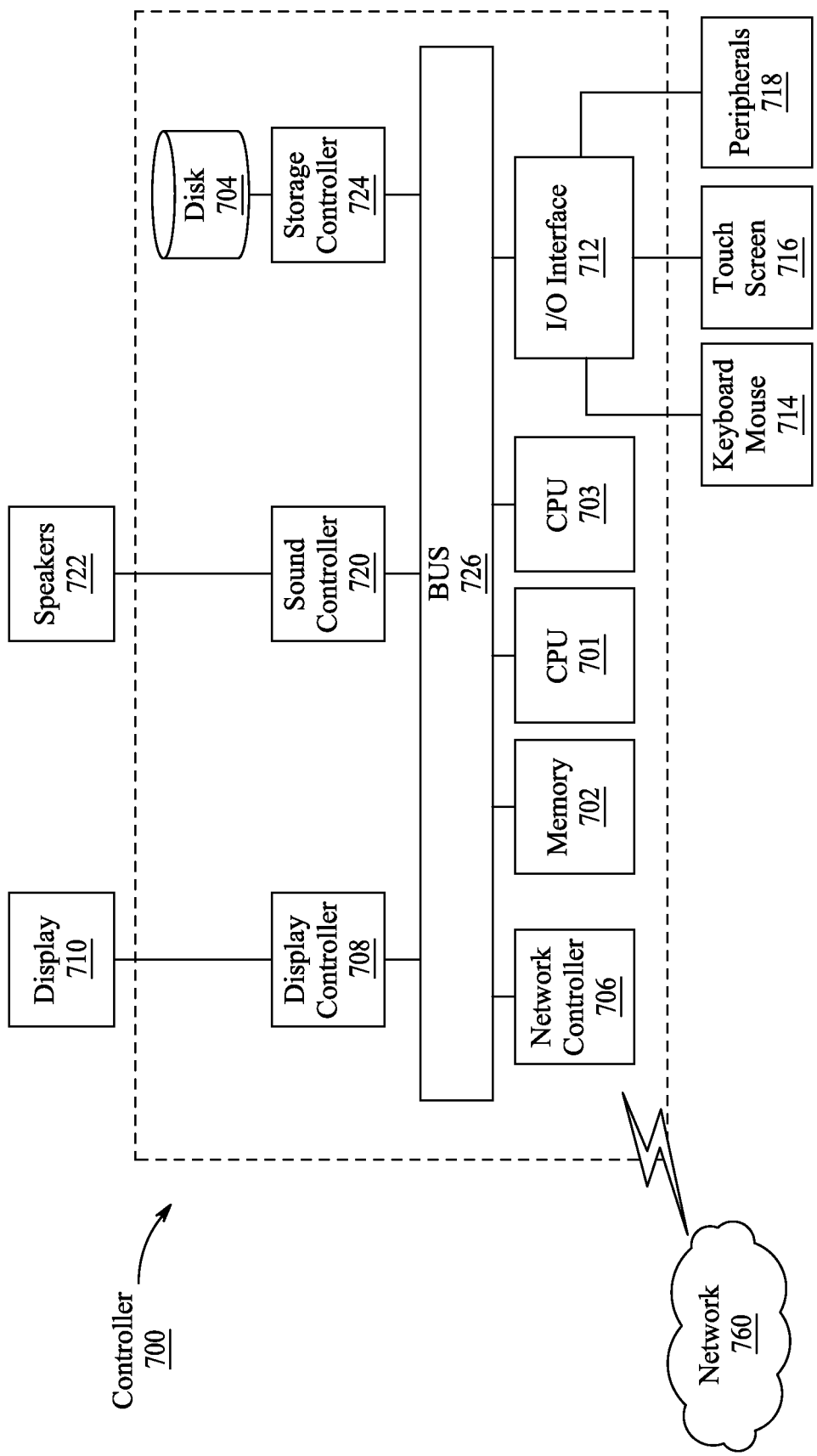
FIG. 7 is an illustration of a non-limiting example of details of computing hardware used in the computing device, according to aspects of the present disclosure.

FIG. 7 is an illustration of a non-limiting example of details of computing hardware used in the computing system, according to exemplary aspects of the present disclosure. In FIG. 7, a controller 700 is described which is a computing device (for example, the intelligent LVRT detector 110 and/or the intelligent power controller 112) and includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 8, UNIX, Solaris, LINUX, Apple MAC-OS, and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general-purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
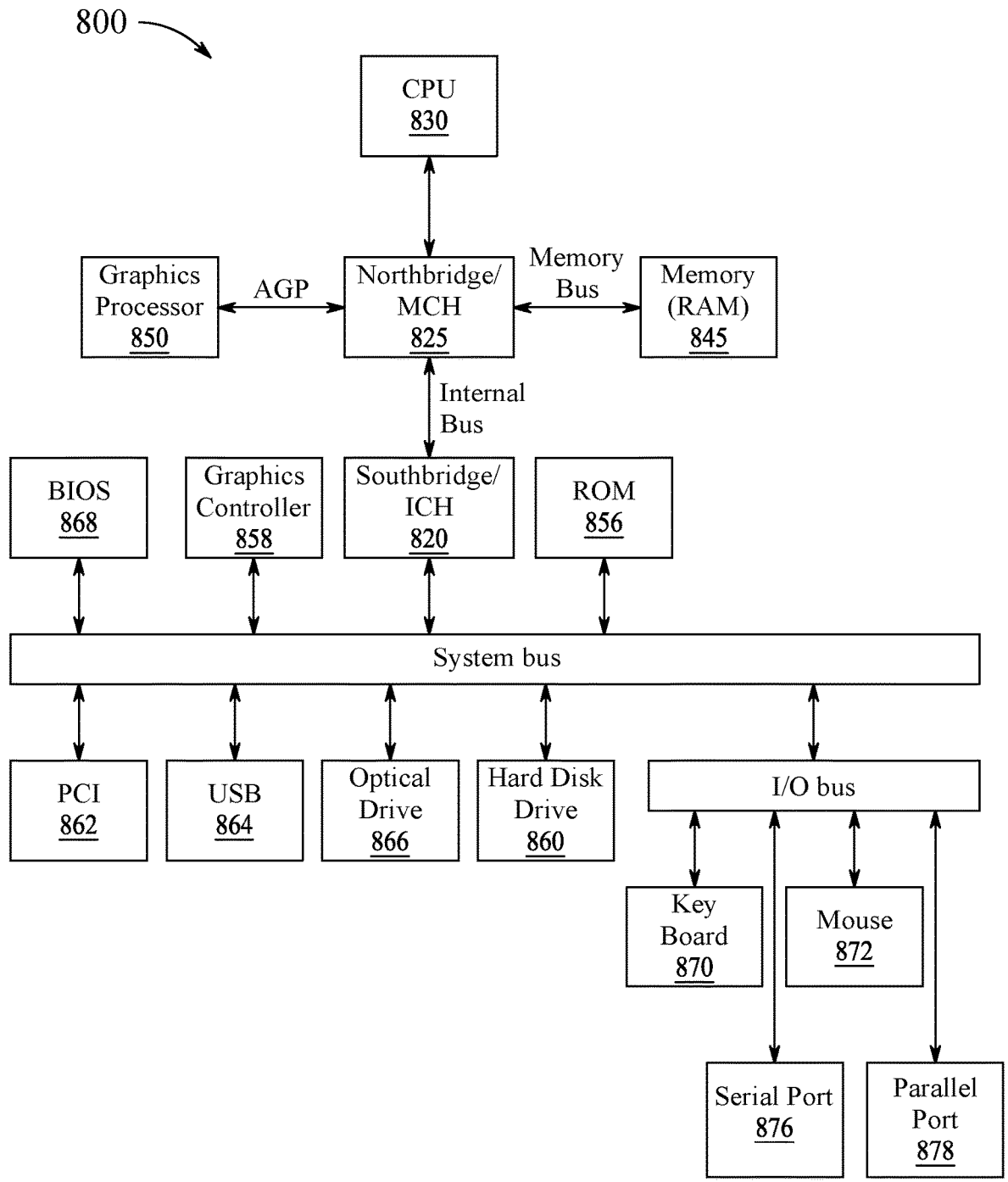
FIG. 8 is an exemplary schematic diagram of a data processing system used within the computing device, according to aspects of the present disclosure.

FIG. 8 shows a schematic diagram of a data processing system 800 used within the computing system, according to exemplary aspects of the present disclosure. The data processing system 800 is an example of a computer in which code or instructions implementing the processes of the illustrative aspects of the present disclosure may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
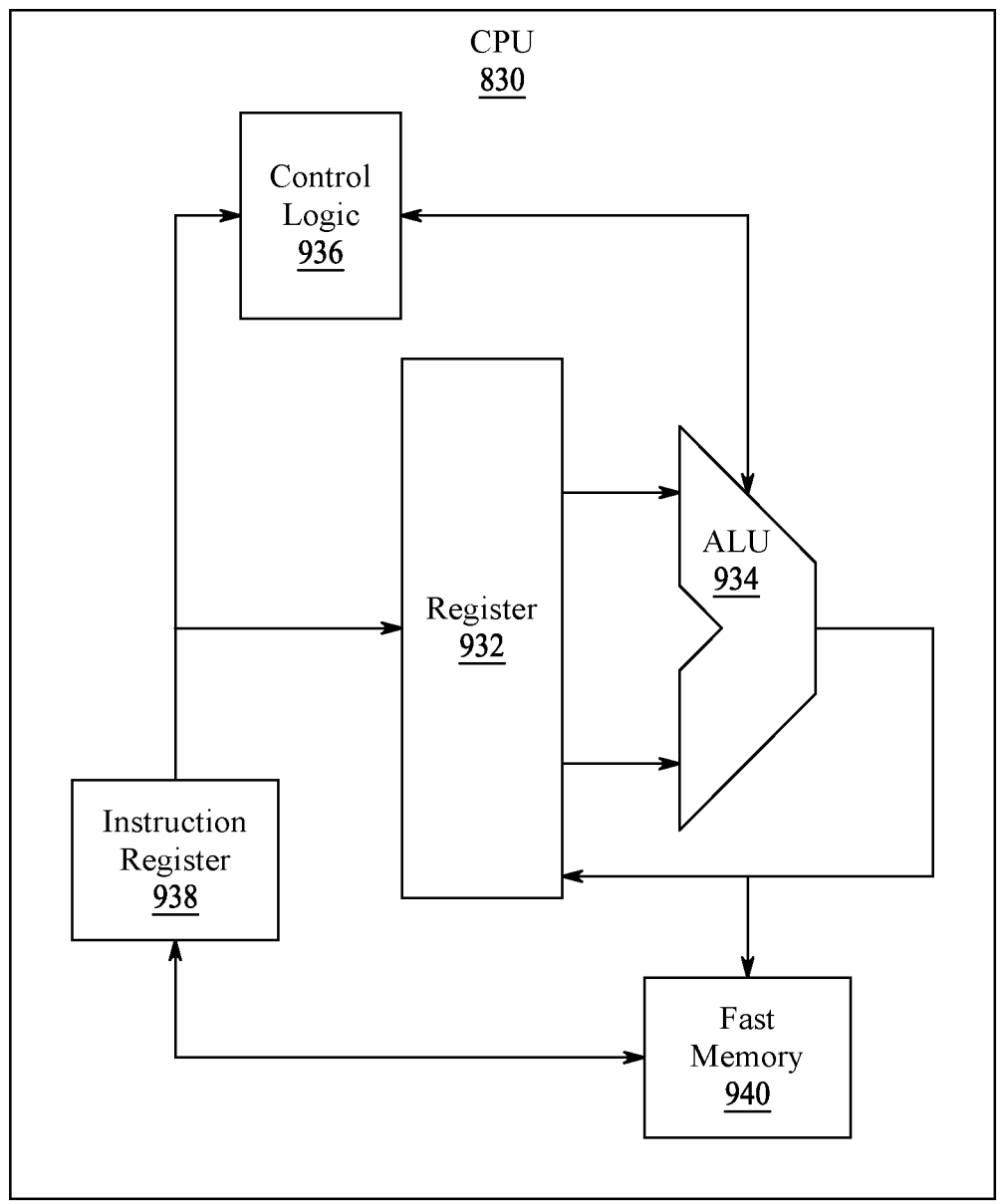
FIG. 9 is an exemplary schematic diagram of a processor used with the computing device, according to aspects of the present disclosure.

For example, FIG. 9 shows one aspects of the present disclosure of CPU 830/930. In one aspects of the present disclosure, the instruction register 938 retrieves instructions from the fast memory 940. At least part of these instructions is fetched from the instruction register 938 by the control logic 936 and interpreted according to the instruction set architecture of the CPU 930. Part of the instructions can also be directed to the register 932. In one aspects of the present disclosure the instructions are decoded according to a hardwired method, and in another aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain aspects of the present disclosures, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 820 through a PCI bus 862.

The PCI devices may include, for example, Ethernet adapters, add-in cards, and PC cards for notebook computers. The Hard disk drive 860 and CD-ROM 856 can use, for example, an integrated drive electronics (IDE) or serial advanced technology attachment (SATA) interface. In one aspects of the present disclosure the I/O bus can include a super I/O (SIO) device.

Further, the hard disk drive (HDD) 860 and optical drive 866 can also be coupled to the SB/ICH 820 through a system bus. In one aspects of the present disclosure, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. For example, generation of the trip signal may also be initiated by the intelligent reactive power controller. The system is not restrictive to be implement in 3 phase system only but with other phase system such as a single phase, dual phase or more than 3 phase circuit. Also, the present system is described in context of photovoltaic system, however, the system is not restrictive and can be easily integrated with other renewable resources such as a wind power. Moreover, the present disclosure is not limited to the specific circuit elements described herein, nor is the present disclosure limited to the specific sizing and classification of these elements. The above-described hardware description is a non-limiting example of corresponding structure for performing the functionality described herein.

The invention claimed is:

1. An artificial intelligence reactive power control system for low voltage ride-through in a grid connected distributed generation network, comprising:
   a utility grid having 3-phase output terminals;
   a 3-phase grid circuit breaker connected to the utility grid;
   a distributed generation circuit including 3-phase terminals connected to the 3-phase grid circuit breaker;
   a voltage and current measurement unit connected to the 3-phase terminals, the voltage and current measurement unit configured to generate a set of measured variables,
   an intelligent low voltage ride-through detector configured to receive the set of measured variables and identify a low voltage ride-through status of the utility grid;
   an intelligent reactive power controller connected between the intelligent low voltage ride-through detector and the distributed generation circuit, the intelligent reactive power controller configured to receive a low voltage ride-through status signal from the intelligent low voltage ride-through detector, control a low voltage ride-through during one or more of a grid voltage sag and a voltage reduction by transmitting one or more of an active power reference value and a reactive power reference value to the distributed generation circuit based on the low voltage ride-through status signal,
   wherein the intelligent low voltage ride-through detector further comprises:
   a database including a set of low voltage ride-through condition data of the distributed generation circuit;
   a set of low pass filters and a set of high pass filters;
   wherein the intelligent low voltage ride-through detector includes a microprocessor having circuitry and program instructions stored therein that, when executed by one or more processors, cause the one or more processors to:
   generate a time/frequency series representation of the set of low voltage ride-through condition data;
   filter the time/frequency series representation to generate informative signatures;
   normalize the informative signatures by scaling the set of low voltage ride-through condition data to generate normalized informative signatures;
   store the normalized informative signatures in the database with a fault type related to each low voltage ride-through condition;
   determine a set of principal components of the normalized informative signatures;
   estimate a nonlinear relationship between each principal component and an associated fault class by an intelligent learning algorithm; and
   generate a trained classifier for low voltage ride-through detection;
   simulate the load variation during the at least one time period including the one or more of the grid voltage sag and the voltage reduction;
   generate a time/frequency series representation of the measured variables for each load variation;
   normalize the time/frequency series representation by scaling the measured variables for each load variation to generate a normalized time/frequency series representation of the measured variables;
   apply the normalized time/frequency series representation of the measured variables to the trained classifier;
   determine the low voltage ride-through status of the connection of the distributed generation circuit with the utility grid;
   calculate the reactive power reference value;
   calculate the active power reference value; and
   transmit the reactive power reference value, the active power reference value and the low voltage ride-through status signal to the intelligent power controller.

2. The artificial intelligence reactive power control system of claim 1, wherein the distributed generation circuit comprises:
   a distributed energy generator;
   a boost converter connected to the distributed energy generator, the boost converter including a first inductor, a first switch, and a first capacitor in parallel with the first switch;
   an inverter connected to the boost converter, the inverter including a plurality of second switches;
   a 3-phase low pass filter having 3-phase input connectors connected to the inverter and the 3-phase output terminals of the utility grid connected to the 3-phase grid circuit breaker;
   an inverter controller; and
   a maximum power point tracking (MPPT) circuit having a MPPT input connected to receive a voltage, $v_{pv}$, and a current, $i_{pv}$, from the distributed energy generator, an MPPT control output connected to the first switch of the boost converter; and an MPPT power setpoint output, $p^*$, connected to the inverter controller.

3. The artificial intelligence reactive power control system of claim 2, wherein the voltage and current measurement unit includes:
   a terminal voltage monitor configured to identify one or more of the grid voltage sag and the voltage reduction in the distributed generation circuit;
   a current monitor configured to measure a load variation during at least one time period including the one or more of the grid voltage sag and the voltage reduction; and
   a voltage dip detection unit capable of identifying a range and a duration of the one or more of the grid voltage sag and the voltage reduction.

4. The artificial intelligence reactive power control system of claim 3, wherein the terminal voltage monitor and the current monitor are configured to identify the one or more of the voltage reduction and the voltage sag at selected time intervals.

5. The artificial intelligence reactive power control system of claim 4, further comprising:
a phase locked loop connected between the voltage and current measurement unit, and the inverter controller, the phase locked loop including a voltage controlled oscillator, wherein the phase locked loop is configured to match a phase of each measured variable of the set of measured variables to a phase of a square wave generated by the voltage controlled oscillator, generate a phase modified grid current, $i_g$ and a phase modified grid voltage, $v_g$, and transmit the phase modified grid current, $i_g$ and the phase modified grid voltage, $v_g$ to the inverter controller 10.

6. The artificial intelligence reactive power control system of claim 1, wherein the intelligent low voltage ride-through detector further comprises:
a trip signal generator connected to the 3-phase grid circuit breaker, the trip signal generator configured to turn off the 3-phase grid circuit breaker when a low voltage ride-through status is detected in which the low voltage persists for a duration greater than a preset time limit.

7. The artificial intelligence reactive power control system of claim 6, wherein the inverter controller further comprises:
a DC voltage controller connected to receive a boost converter DC voltage input, $V_{dc}$;
a grid synchronization circuit configured to receive a DC voltage setpoint value, $V_{dc}*$ and the MPPT power setpoint output, p*;
a current controller connected to the intelligent reactive power controller, the current controller configured to receive one or more of the active power reference value and the reactive power reference value from the intelligent reactive power controller; and
a pulse width modulator connected to the inverter, the pulse width modulator configured to generate drive signals based on the one or more of the active power reference value and the reactive power reference value, the drive signals configured to actuate the plurality of switches of the inverter.

8. The artificial intelligence reactive power control system of claim 7, wherein the intelligent reactive power controller comprises:
an input connected to the low voltage ride-through detector, the input configured to receive the low voltage ride-through status signal;
a microcontroller;
a frequency divider configured to generate a plurality of frequencies;
a programmable logic array configured to mix each of the plurality of frequencies with the low voltage ride-through status signal and generate a plurality of switching indexes divided by class based on the frequency and the low voltage ride-through status;
a timing circuit configured to divide each switching index into a series of time instances for each class;
a multiplexer configured to mix the equivalent time instances, the reactive power reference value, the active power reference value, the plurality of frequencies and the low voltage ride-through status signal, generate an updated active power reference value and an updated reactive power reference value;
a multiplexor output configured to transmit the updated active power reference value and the updated reactive power reference value to the current controller.

9. The artificial intelligence reactive power control system of claim 7, wherein the distributed energy generator is a plurality of photovoltaic panel arrays and the inverter is a photovoltaic inverter.

10. The artificial intelligence reactive power control system of claim 7, wherein the distributed energy generator is any one of a plurality of photovoltaic panel arrays, a plurality of wind power turbines and a plurality of wave generators.

11. The artificial intelligence reactive power control system of claim 7, wherein the plurality of second switches of the inverter comprises:
three pairs of series-connected second switches, a first pair having a first common output connected to a first phase input of the 3-phase low pass filter, a second pair having a second common output connected to a second phase input of the 3-phase low pass filter, and a third pair having a third common output a third phase input of the 3-phase low pass filter.

12. The artificial intelligence reactive power control system of claim 7, wherein the 3-phase low pass filter comprises:
a first phase inductor connected to a first phase capacitor and a first switching inductor, the first phase capacitor connected to a neutral connection;
a second phase inductor connected to a second phase capacitor and a second switching inductor, the second phase capacitor connected to the neutral connection;
a third phase inductor connected to a third phase capacitor and a third switching inductor, the third phase capacitor connected to the neutral connection; and
wherein an output of each switching inductor is connected a phase of the 3-phase grid circuit breaker.

13. A method for reactive power control of a low voltage ride-through in a grid connected distributed generation network, comprising:
receiving a set of grid codes specifying rules for connecting a distributed generation circuit to a set of 3-phase connectors of a utility grid;
measuring a voltage and a current of each of the 3-phase connectors and generating a set of measured variables;
identifying, by an intelligent low voltage ride-through detector, a low voltage ride-through status of the utility grid;
receiving, by an intelligent reactive power controller, a low voltage ride-through status signal from the intelligent low voltage ride-through detector;
controlling the low voltage ride-through during at least one time period including one or more of a grid voltage sag and a voltage reduction by transmitting one or more of an active power reference value and a reactive power reference value to the distributed generation circuit based on the low voltage ride-through status signal; and
sending a trip signal to a 3-phase grid circuit breaker connected to the set of 3-phase connectors of the utility grid to turn off the 3-phase grid circuit breaker when a low voltage ride-through status is detected in which the low voltage persists for a duration greater than a preset time limit,
generating a trained classifier for low voltage ride-through detection by:
determining a set of low voltage ride-through condition data from the set of grid codes;

generating a time/frequency series representation of the set of low voltage ride-through condition data;

filtering the time/frequency series representation to generate informative signatures;

normalizing the informative signatures by scaling the set of low voltage ride-through condition data to generate normalized informative signatures;

storing the normalized informative signatures in a database with a fault type related to each low voltage ride-through condition;

determining a set of principal components of the normalized informative signatures; and estimating a nonlinear relationship between each principal component and an associated fault class by an intelligent learning algorithm;

simulating a load variation during the at least one time period including the one or more of the grid voltage sag and the voltage reduction;

generating a time/frequency series representation of the measured variables for each load variation;

normalizing the time/frequency series representation by scaling the measured variables for each load variation to generate a normalized time/frequency series representation of the measured variables;

applying the normalized time/frequency series representation of the measured variables to the trained classifier;

determining the low voltage ride-through status of the connection of the distributed generation circuit with the utility grid;

calculating the reactive power reference value;

calculating the active power reference value;

transmitting the reactive power reference value, the active power reference value and the low voltage ride-through status signal to the intelligent reactive power controller of the distributed generation circuit.

14. The method of claim 13, further comprising:

receiving, by a DC voltage controller, a boost converter DC voltage input, $V_{dc}$;

receiving, by a grid synchronization circuit, a DC voltage setpoint value, $V_{dc}^*$ and an MPPT power setpoint output, $p^*$;

receiving, by a current controller connected to the intelligent reactive power controller, the one or more of the active power reference value and the reactive power reference value;

generating, by a pulse width modulating connected to an inverter of the distributed generation circuit, drive signals based on the one or more of the active power reference value and the reactive power reference value; and actuating a plurality of switches of the inverter to ride-through the one or more of the grid voltage sag and the voltage reduction.

* * * * *